(12) United States Patent
Kim et al.

(10) Patent No.: US 11,919,062 B2
(45) Date of Patent: *Mar. 5, 2024

(54) METHOD OF MANUFACTURING HOT PRESS-FORMED MEMBER HAVING EXCELLENT PRODUCTIVITY, WELDABILITY AND FORMABILITY

(71) Applicant: POSCO Co., Ltd, Pohang-si (KR)

(72) Inventors: Hong Gee Kim, Incheon (KR); Hyun Sung Son, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,945

(22) Filed: Jan. 19, 2023

(65) Prior Publication Data
US 2023/0158559 A1    May 25, 2023

Related U.S. Application Data

(63) Continuation of application No. 17/008,827, filed on Sep. 1, 2020, now Pat. No. 11,590,549.

(30) Foreign Application Priority Data

Jul. 10, 2020    (KR) .................. 10-2020-0085533
Aug. 12, 2020    (KR) .................. 10-2020-0101357

(51) Int. Cl.
   B21D 22/02    (2006.01)
   B32B 15/01    (2006.01)
   (Continued)

(52) U.S. Cl.
   CPC .......... B21D 22/022 (2013.01); B32B 15/012 (2013.01); C21D 1/18 (2013.01);
   (Continued)

(58) Field of Classification Search
   CPC ...... B21D 22/022; B32B 15/012; C21D 1/18; C21D 1/673; C21D 6/00; C21D 6/002;
   (Continued)

(56) References Cited

U.S. PATENT DOCUMENTS

2007/0017272 A1    1/2007    Kurisu et al.
2011/0006491 A1    1/2011    Spehner et al.
(Continued)

FOREIGN PATENT DOCUMENTS

CN    101910426 A    12/2010
CN    102089451 A    6/2011
(Continued)

OTHER PUBLICATIONS

International Search Report dated Mar. 15, 2021 issued in International Patent Application No. PCT/KR2020/011662 (with English translation).

(Continued)

*Primary Examiner* — Jenny R Wu
(74) *Attorney, Agent, or Firm* — Morgan, Lewis & Bockius LLP

(57) ABSTRACT

An method of manufacturing a hot press-formed member comprises heating a blank of an aluminum-based plated steel sheet in a heating furnace, removing the heated blank from the heating furnace and conveying the removed blank between an upper mold portion and a lower mold portion of a mold, mounted on a press, to be seated; and performing a forming process after the upper mold portion of the mold is in contact with the seated blank.

12 Claims, 8 Drawing Sheets

(51) Int. Cl.
  *C21D 1/18* (2006.01)
  *C21D 6/00* (2006.01)
  *C21D 9/46* (2006.01)
  *C22C 21/02* (2006.01)
  *C22C 38/00* (2006.01)
  *C22C 38/02* (2006.01)
  *C22C 38/04* (2006.01)
  *C22C 38/06* (2006.01)
  *C22C 38/32* (2006.01)

(52) U.S. Cl.
  CPC .............. *C21D 6/002* (2013.01); *C21D 6/005* (2013.01); *C21D 6/008* (2013.01); *C21D 9/46* (2013.01); *C22C 21/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/32* (2013.01)

(58) Field of Classification Search
  CPC .......... C21D 6/005; C21D 6/008; C21D 7/13; C21D 8/005; C21D 9/46; C21D 9/56; C22C 21/02; C22C 38/001; C22C 38/002; C22C 38/02; C22C 38/04; C22C 38/06; C22C 38/32; C23C 2/12; C23C 2/28; C23C 2/29; C23C 28/021; C23C 28/028; C23C 30/00
  See application file for complete search history.

(56) References Cited

U.S. PATENT DOCUMENTS

| | | |
|---|---|---|
| 2011/0165436 A1 | 7/2011 | Drillet et al. |
| 2011/0174418 A1 | 7/2011 | Maki et al. |
| 2012/0090741 A1 | 4/2012 | Pellmann et al. |
| 2016/0082496 A1 | 3/2016 | Kim et al. |
| 2017/0043386 A1 | 2/2017 | Nakagaito et al. |
| 2018/0265944 A1 | 9/2018 | Skrikerud et al. |
| 2020/0010915 A1 | 1/2020 | Oh et al. |

FOREIGN PATENT DOCUMENTS

| | | |
|---|---|---|
| CN | 109477191 A | 3/2019 |
| CN | 110180957 A | 8/2019 |
| EP | 3611288 A1 | 2/2020 |
| JP | 2020-509179 A1 | 3/2020 |
| KR | 10-2006-0054479 A | 5/2006 |
| KR | 10-2009-0086970 A | 8/2009 |
| KR | 10-1033361 B1 | 5/2011 |
| KR | 10-2014-0125562 A1 | 10/2014 |
| KR | 10-2016-0130831 A1 | 11/2016 |
| KR | 10-2018-0111765 A1 | 10/2018 |
| KR | 10-2019-0084288 A1 | 7/2019 |
| KR | 10-2020-0076071 A | 6/2020 |
| KR | 10-2020-0080721 A | 7/2020 |
| KR | 20200080721 A * | 7/2020 |
| WO | 2008/053273 A1 | 5/2008 |
| WO | 2018/115951 A1 | 6/2018 |
| WO | 2020/030200 A1 | 2/2020 |

OTHER PUBLICATIONS

U.S. Notice of Allowance dated Oct. 26, 2022 issued in U.S. Appl. No. 17/008,827.
Chinese Office Action dated Apr. 4, 2023 issued in Chinese Patent Application No. 202010911953.9.
European Search Report dated May 2, 2023 issued in European Patent Application No. 20944436.3.
T. Taylor, et al., "Critical Review of Automotive Hot-Stamped Sheet Steel From An Industrial Perspective," Materials Science and Technology, vol. 34, No. Jan. 18, 2018.

* cited by examiner

METHOD OF MANUFACTURING HOT PRESS-FORMED MEMBER HAVING EXCELLENT PRODUCTIVITY, WELDABILITY AND FORMABILITY

CROSS-REFERENCE TO RELATED APPLICATION(S)

This application is a continuation patent application of U.S. patent application Ser. No. 17/008,827, filed on Sep. 1, 2020, which claims the benefit of Korean Patent Application No. 10-2020-0085533 filed on Jul. 10, 2020 and Korean Patent Application No. 10-2020-0101357 filed on Aug. 12, 2020, the entire disclosures of which are incorporated herein by reference for all purposes.

BACKGROUND

1. Field

This application relates to a method of manufacturing hot press-formed member having excellent productivity, weldability and formability

2. Description of Related Art

With demand for reduced weight and improved safety in vehicles, high-strength steel utilizing a hot press forming method has been actively applied. In a hot press forming process, heating and quenching processes of a material are necessarily required. An aluminum plated steel material or aluminum alloy plated steel material is used to prevent scale from occurring at high temperatures. An aluminum plated steel material or an aluminum alloy plated steel material has an issue on melting of a plating layer during rapid heating, and is generally heated at a low rate in an atmospheric heating furnace.

According to a heating method in such an atmospheric heating furnace, heating is performed in a furnace set to the same atmospheric temperature or performed in a continuous heating furnace such as a roller hearth furnace having a plurality of heating zones in such a manner that an atmospheric temperature is sequentially increased. However, in such methods, heating is performed at a slow rate, and thus, heating should be performed in a heating furnace for a certain period of time to secure time required to reach a target temperature. In addition, productivity may be deteriorated due to an increase in maintaining time in the heating furnace.

Accordingly, a heating temperature may be increased to reduce in-furnace maintenance time. In such a case, the heating temperature is increased, and thus, a thickness of a diffusion layer in an alloy layer is increased to cause poor weldability.

Therefore, a method of increasing a heating temperature to reduce in-furnace maintenance time has been required to improve productivity. In addition, a method of significantly reducing a thickness of a diffusion layer such that a heating temperature of blank is not maintained at a high level has been required to secure weldability of manufactured formed products.

However, in the prior art it has not been possible to simultaneously apply a reduction in in-furnace maintenance time and a decrease in heating temperature at the same time due to opposite effects thereof.

In addition to the above-described issue, when a temperature of a heating furnace is continuously increased to improve weldability, formability may be deteriorated. A technology, capable of securing improved productivity, weldability, and formability, has not been developed to date.

PRIOR ART DOCUMENT

Patent Document

Korean Patent Publication No. 10-2006-0054479

SUMMARY

An aspect of the present disclosure is to provide a method of manufacturing a hot press-formed member having improved productivity, weldability, and formability.

According to an aspect of the present disclosure, a method of manufacturing a hot press-formed member comprises heating a blank of an aluminum-based plated steel sheet in a heating furnace, removing the heated blank from the heating furnace and conveying the removed blank between an upper mold portion and a lower mold portion of a mold, mounted on a press, to be seated; and performing a forming process after the upper mold portion of the mold is in contact with the seated blank. The heating furnace is a continuous heating furnace comprising section A, section B, and section C provided in a conveying direction of a blank. Heating in section A satisfies conditions specified by a figure 'abcde' having cumulative in-furnace maintaining times and in-furnace atmospheric temperature coordinates of approximately a(0.2 min, 750° C.), b(1.0 min, 750° C.), c(1.0 min, 800° C.), d(1.5 min, 900° C.), and e(0.2 min, 900° C.). Heating in section B satisfies conditions specified by a figure 'fghi' having cumulative in-furnace maintaining times and atmospheric temperature coordinates of approximately $$f\left(1.3 + \frac{t-1.2}{0.6} \times 0.5 \text{ min}, 930° \text{ C.}\right),$$

$$g\left(3.8 + \frac{t-1.2}{0.6} \times 0.5 \text{ min}, 930° \text{ C.}\right),$$

$$h\left(3.3 + \frac{t-1.2}{0.6} \times 0.5 \text{ min}, 960° \text{ C.}\right), \text{ and}$$

$$i\left(0.8 + \frac{t-1.2}{0.6} \times 0.5 \text{ min}, 960° \text{ C.}\right).$$

Heating in section C satisfies conditions specified by a figure 'jklm' having cumulative in-furnace maintaining times and atmospheric temperature coordinates of approximately $$j\left(3.7 + \frac{t-1.2}{0.6} \text{ min}, 870° \text{ C.}\right), k\left(11.7 + \frac{t-1.2}{0.6} \times 2 \text{ min}, 870° \text{ C.}\right),$$

$$l\left(7.03 + \frac{t-1.2}{0.6} \times 2 \text{ min}, 940° \text{ C.}\right), \text{ and}$$

$$m\left(2.53 + \frac{t-1.2}{0.6} \text{ min}, 940° \text{ C.}\right).$$

A highest atmospheric temperature of section C is lower than a highest atmospheric temperature of section B. t denotes a thickness of a blank and a unit thereof is millimeters (mm), when the thickness t is 1.5 mm or less, and an atmospheric temperature of section B is more than 930° C. to less than 940° C., when the thickness t is greater than 1.5 mm, and an atmospheric temperature of section B is more than 940° C. to 960° C. or less, and a plating layer of the blank has a thickness of 20 μm or more.

DETAILED DESCRIPTION

Figure 1:
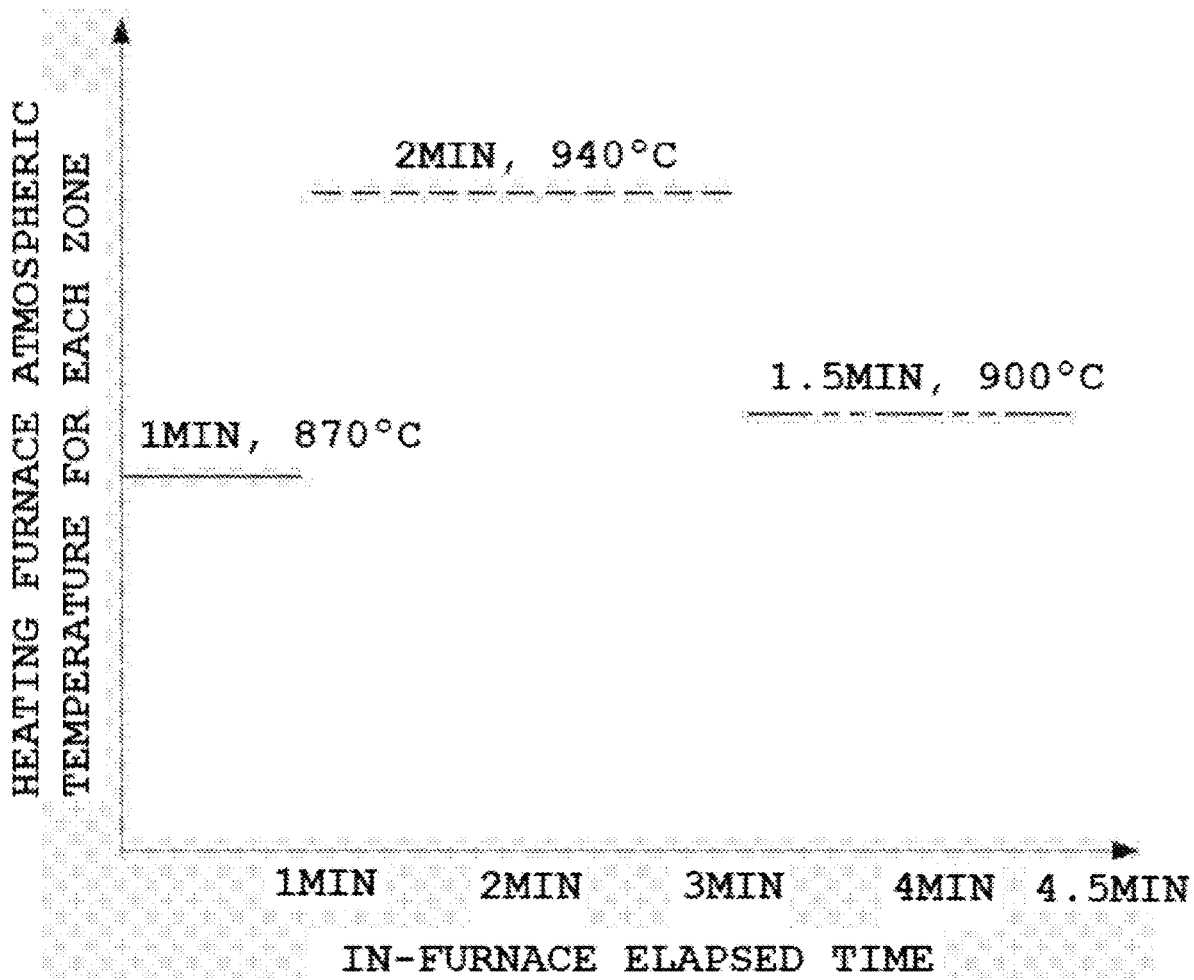
FIG. 1 is a graph illustrating a heating pattern of an aluminum plated material having a thickness of 1.2 mm.

Hereinafter, embodiments of the present disclosure will be described in more detail. However, the embodiments of the present disclosure can be implemented in various forms and the scope of the present disclosure is not limited to the embodiments described herein. In addition, the embodiments of the present disclosure are provided in order to provide more complete explanation of the present disclosure for a person having ordinary knowledge in the field to which the present invention pertains.

Hereinafter, a method of manufacturing a hot press-formed member of the present disclosure will be described in detail. Unless otherwise defined in this specification, all terms and methods commonly used in the art may be applied to the present disclosure.

A method of manufacturing a hot press-formed member according to an aspect of the present disclosure may comprise heating a blank of an aluminum-based plated steel sheet in a heating furnace, removing the heated blank from the heating furnace and conveying the removed blank between an upper mold portion and a lower mold portion of a mold, mounted on a press, to be seated, and performing a forming process after the upper mold portion of the mold is in contact with the seated blank.

Alternatively, after performing the forming process, the method of manufacturing a hot press-formed member may further comprise an in-mold cooling step, in which the upper mold portion of the mold reaches a press bottom dead center and is then maintained to quench a formed material, and a step of removing a cooled formed member.

According to an aspect of the present disclosure, the aluminum-based plated steel sheet may be an aluminum plated steel sheet or an aluminum alloy plated steel sheet. In this case, although not necessarily limited, as an example, a plating layer may comprise, by weight percentage (wt %), 5 to 11% of silicon (Si), 4.5% or less of iron (Fe), and a balance of aluminum (Al) and unavoidable impurities. In addition, a base steel sheet may include, by wt %, 0.1 to 0.5% of carbon (C), 0.1 to 2% of silicon (Si), 0.5 to 3% of manganese (Mn), 0.01 to 0.5% of chromium (Cr), 0.001 to 1.0% of aluminum (Al), 0.05% or less of phosphorus (P), 0.02% or less of sulfur (S), 0.02% or less of nitrogen (N), 0.002 to 0.005% of boron (B), and a balance of iron (Fe) and unavoidable impurities.

According to an aspect of the present disclosure, the heating furnace may be a continuous heating furnace comprising section A, section B, and section C provided sequentially in a conveying direction of the blank. In this case, section A, section B, and section C do not need to be provided adjacent to each other in the conveying direction of the blank, and have only to satisfy the above sequence in the conveying direction of the blank. For example, each of section A, section B, and section C may include a single heating zone, or a plurality of heating zones may be included in each of section A, section B, and section C. An additional section, set to a temperature between pre-step and post-step temperature ranges, may be further provided between the respective sections (for example, between sections A and B or between sections B and C).

In a conventional atmospheric heating method, heating is performed in a heating furnace set to the same atmospheric temperature, or heating is performed in such a manner that an atmospheric temperature is sequentially increased by a continuous heating furnace such as a roller hearth furnace having a plurality of heating zones.

However, since such heating is performed at a low rate, heating in a heating furnace is necessarily performed for a certain period of time to secure time required to reach a target temperature. In addition, productivity may be deteriorated due to an increase in maintaining time in the heating furnace.

In this regard, the present inventors found that when an atmospheric temperature is set to be high while increasing a temperature of section B, heating is performed more rapidly than a conventional heating furnace setting method, and thus, in-furnace maintaining time may be reduced to improve productivity. In addition, the present inventors found that when the temperature of section C in a subsequent process is set to be lower than the temperature of section B, the above-described process, a final heating temperature is set to be low, and thus, poor weldability may be addressed.

A factor, determining the above-mentioned productivity, may be significant reduction of time required to reach 900° C., significant reduction of time required for a temperature of a material to reach a take-out temperature of the heating furnace in a section in which a material is removed from the heating furnace, or whether overall cumulative maintaining time in the heating furnace until the material is removed of the heating furnace is less than or equal to time for which a diffusion layer has a thickness of 15 μm. By minimizing the above-mentioned times, a cycle time in which target physical properties of a formed member, an end product, may be secured could be reduced significantly. Thus, productivity may be improved.

However, when section B set to the above-mentioned high temperature is too wide, the thickness of the diffusion layer may be increased as time required to be heated and maintained at a high temperature is significantly reduced. Thus, weldability may be deteriorated. Meanwhile, when section B set to the high temperature is too narrow, an effect of improving productivity by a high heating rate may not be obtained. A large amount of energy is consumed to maintain section A, an initial section of the heating furnace, at a high temperature. At an initial stage of temperature rising, it is unnecessary to set the temperature to an unnecessarily high atmospheric temperature. In addition, the temperature may not be set to a high atmospheric temperature from the beginning due to heat radiation from an open structure of an injection portion of a material and injection of a cold material.

Since a material heated to a sufficient temperature has already been transformed into austenite, it may be only necessary to maintain a temperature and time at which alloying of a plating layer may be sufficiently obtained. When a high atmospheric temperature is maintained even in this stage, weldability may be deteriorated due to an excessive increase in thickness of a diffusion layer. Therefore, the temperature may be set to be a relatively low temperature.

In view of the foregoing, in the present disclosure, as an example, a heating pattern illustrated in FIG. 1 was performed on an aluminum plated material having a thickness of 1.2 mm. For example, in section A, an initial section of temperature rising, a temperature was set to a relatively low temperature in consideration of energy saving and inability to be set to a high atmospheric temperature. In section B, the temperature was set to a highest temperature to rapidly heat the material, and thus, the material was set to reach a sufficient temperature. In section C after the material reached the sufficient temperature, the temperature was reset to a lower temperature than that of section B. When the heating furnace is set to be different for each section as illustrated in FIG. 1, the material having a thickness of 1.2 mm is maintained at a temperature of 900° C. at a point in time at which cumulative furnace maintaining time is 4.5 minutes. This result was derived from a result of heating analysis on radiation and convective heat transfer in a heating furnace atmosphere. Hereinafter, heating conditions in each section will be described in further detail.

In this specification, an atmospheric temperature in each section to be described later may refer to an atmosphere maintaining temperature in each heating zone (for example, a temperature of a region in which an actual atmospheric temperature is maintained in a single heating zone) in a heating furnace having a plurality of heating zones and being able to control atmospheric temperatures of the respective heating zones to be distinguished from each other. For example, an atmosphere maintaining temperature in a single heating zone may be a temperature measured at a representative point of a region in which the actual atmospheric temperature is maintained. Although not necessarily limited, an example of the representative point may be a point disposed in a center (½) in a length direction, a ¼ location in a width direction, and spaced apart from a blank location by 250 mm in a height direction with respect to a single heating zone. In this case, the atmospheric temperature in each section is regarded as being maintained at the atmosphere maintaining temperature in each heating zone corresponding to each section.

In the above-described heating furnace having a plurality of heating zones and being able to control atmospheric temperatures of the respective heating zones to be distinguished from each other, cumulative in-furnace maintaining time in each section may refer to a maintaining time from a point in time at which a blank, a material, is injected into the heating furnace to a point in time at which the blank is removed of a last heating zone, among the heating zones corresponding to the above-mentioned sections.

In the above-described heating furnace, the heating zones may be separated by a partition wall or the like, or may be separated without a partition wall or the like. Therefore, when the heating zones may be separated by a partition wall or the like, the above-described method may be applied as it is.

When no partition wall is provided in the above-described heating furnace, the entire heating furnace is divided into the number of n zones (for example, five or more zones) in the conveying direction of the blank. Each of the divided zones may be regarded as a single section. In an example embodiment, the entire heating furnace may be divided into 20 equal sections, and each of the 20 divided zones may be regarded as a single section. In a single zone, a temperature measured in a point disposed in a center (½) in a length direction, a ¼ location in a width direction, and spaced apart from a blank location by 250 mm in a height direction may be regarded as an atmosphere maintaining temperature in each section, as described above.

As an example, according to an aspect of the present disclosure, heating in section A may be set to an atmospheric temperature of about 750 to 900° C., heating in section B may be set to an atmospheric temperature of about 930 to 960° C., and heating in section C may be set to about 870° C. and to an atmospheric temperature lower than an atmospheric temperature selected in section B. When such a method is used, temperature rise may be performed more rapidly than a case in which heating is set to a uniform temperature of a final temperature, and thus, the in-furnace maintaining time may be reduced. In addition, formation of an excessive diffusion layer and deterioration of weldability may be prevented by controlling the heating to an appropriate range of a temperature and time at which alloying of a plating layer may be sufficiently obtained. Accordingly, a hot press forming method, capable of obtaining both excellent productivity and weldability, may be effectively provided.

Figure 2:
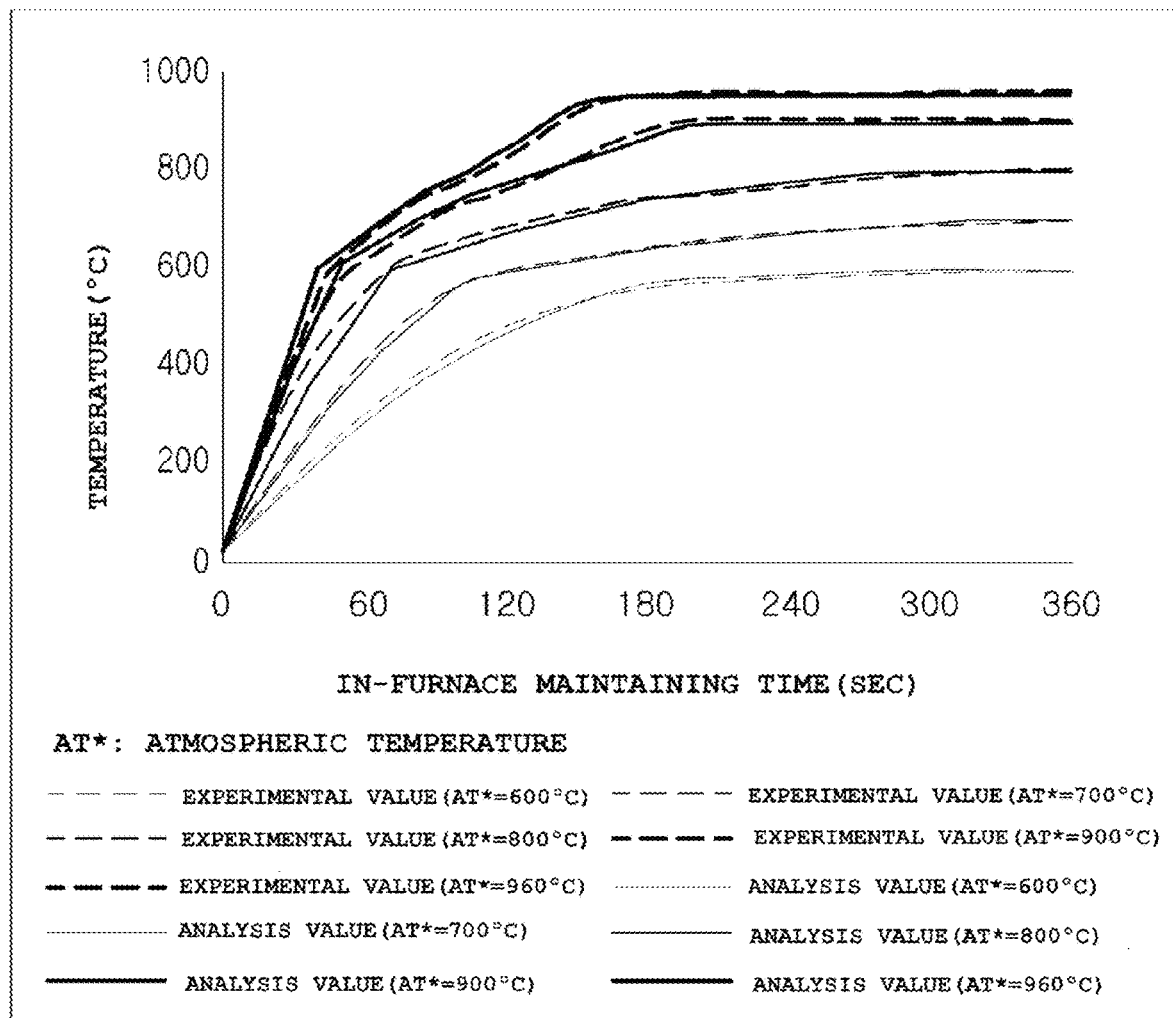
FIG. 2 is a graph illustrating a comparison between heating analysis experimental values and analysis values under various furnace atmospheric temperature conditions for an aluminum plated material having a thickness of 1.2 mm.

FIG. 2 is a graph illustrating feasibility of the above-mentioned heating analysis technology and illustrating a comparison between heating analysis experimental values and analysis values under various furnace atmospheric temperature conditions for an aluminum plated material having a thickness of 1.2 mm. In the experimental value, one piece of temperature data was obtained per second after a thermocouple attached to the material was maintained in a heating furnace. The analysis value is a result obtained by predicting such a condition using the above-mentioned analysis technique. As can be seen from FIG. 2, it can be confirmed that the analysis value expresses the experimental value well.

The present inventors analyzed a temperature rise pattern in various conditions to find out that a temperature rise pattern of a material is dependent on a thickness of the material, an atmospheric temperature, a maintaining time for each temperature zone, and the like. As described above, the present inventors found that the thickness of the material, an atmospheric temperature, a time required to stay at each atmospheric temperature are important in order to prevent a time required for staying in a high atmospheric temperature zone from excessively increasing and to avoid inability, to obtain a rapid heating effect, caused by a significantly short time required to stay in a high atmospheric temperature zone. Therefore, the present inventors have completed the present disclosure based on the fact that it is necessary to select an appropriate maintaining time depending on the thickness of the material and the atmospheric temperature. This will be described in detail below.

Specifically, based on a graph in which an X axis denotes cumulative in-furnace maintaining time and a Y axis denotes an atmospheric temperature in the heating furnace, the heating in section A may satisfy conditions specified by a figure 'abcde' having cumulative in-furnace maintaining times and in-furnace atmospheric temperature coordinates of approximately a(0.2 min, 750° C.), b(1.0 min, 750° C.), c(1.0 min, 800° C.), d(1.5 min, 900° C.), and e(0.2 min, 900° C.).

Since the heating in section A affects an initial temperature rising rate to a temperature setting region of a front portion of the heating furnace, an atmospheric temperature in the furnace in section A may be set to, in detail, a range of about 750° C. to about 900° C. When the atmospheric temperature in the heating furnace in section A is set to less than about 750° C., the initial temperature rising rate may be significantly reduced to deteriorate productivity. Meanwhile, when the atmospheric temperature in the heating furnace in section A is set to higher than about 900° C., an initial region of the heating furnace is maintained at a high temperature to increase power consumption.

Figure 3:
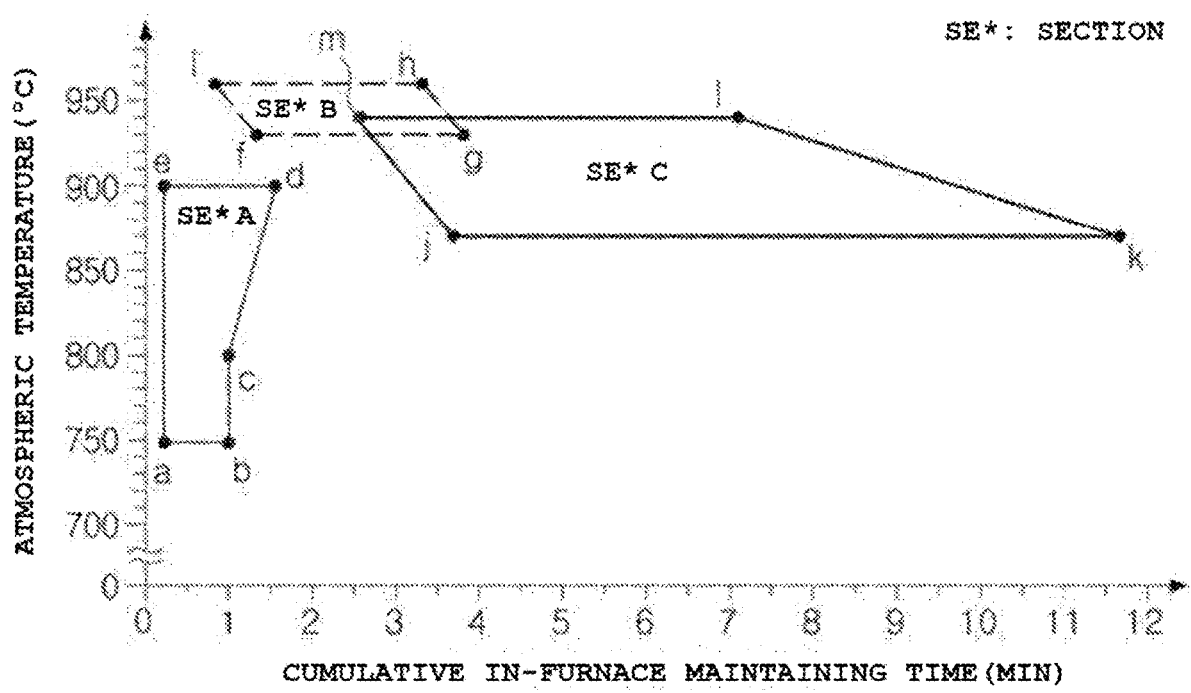
FIG. 3 is a graph illustrating preferable atmospheric temperature conditions according to cumulative in-furnace maintaining time of the present disclosure for heating of an aluminum plated material having a thickness of 1.2 mm.

In the heating in section A, not only the atmospheric temperature but also the maintaining time affect a temperature rising rate. In this case, to increase the temperature rising rate, the maintaining time in section A may be set to be short when the atmospheric temperature of section A is low and may be set to be long when the atmospheric temperature of section A is high. Thus, the present inventors have intensively examined a preferable in-furnace atmospheric temperature and a preferable maintaining time for the heating in section A to find out that conditions of section A are preferably set as illustrated in FIG. 3. For example, when the atmospheric temperature of section A is a low temperature of about 750° C., the maintaining time of section A may be set to be short, in detail, about 1 minute or less. In addition, when the atmospheric temperature of section A is a high temperature of about 900° C., the maintaining time may be set to be, in detail, about 1.5 minutes or less. Meanwhile, the maintaining time in section A may be about 0.2 minute or more in consideration of a time of passing through an entrance side of the heating furnace.

Figure 5A:
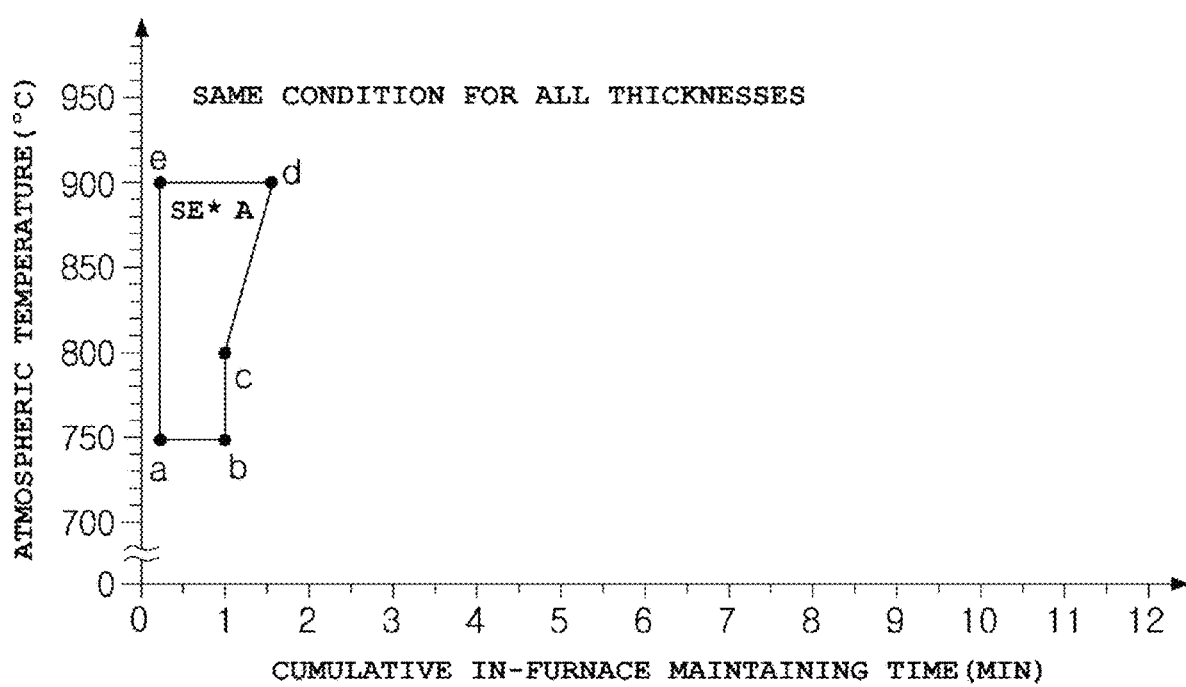
FIG. 5A to FIG. 5C illustrate conditions for heating of an aluminum plated material in consideration of a change in thickness of a material.

In addition to the cumulative in-furnace maintaining time and the atmospheric temperature, the thickness of the material may also have an effect. However, since a thickness-dependent effect was reflected in heating in section B and section C to be described later and an effect in section A is somewhat less, the maintaining time may be set in section A, irrespective of the thickness of the material, from a practical point of view (see FIG. 5A).

Then, the heating in section B may satisfy conditions specified by a figure 'fghi' having cumulative in-furnace maintaining times and atmospheric temperature coordinates of approximately $$f\left(1.3 + \frac{t-1.2}{0.6} \times 0.5 \text{ min}, 930° \text{ C.}\right),$$

$$g\left(3.8 + \frac{t-1.2}{0.6} \times 0.5 \text{ min}, 930° \text{ C.}\right),$$

$$h\left(3.3 + \frac{t-1.2}{0.6} \times 0.5 \text{ min}, 960° \text{ C.}\right), \text{ and}$$

$$i\left(0.8 + \frac{t-1.2}{0.6} \times 0.5 \text{ min}, 960° \text{ C.}\right).$$

In this case, a unit of the coordinates of the figure 'fghi' is f(1.3 [min]+{(t [mm]−1.2 [mm])/0.6 [mm]}×0.5 [min], 930 [° C.]), g(3.8 [Min]+{(t [mm]−1.2 [mm])/0.6 [mm]}×0.5 [min], 930 [° C.]), h(3.3 [min]+{(t [mm]−1.2 [mm])/0.6 [mm]}×0.5 [min], 960 [° C.]), i(0.8 [min]+{(t [mm]−1.2 [mm])/0.6 [mm]}×0.5 [min], 960 [° C.]).

The heating in section B is heating in a region of the heating furnace in which the atmospheric temperature is highest, and affects a temperature rising rate and a maximum temperature of the material in a high-temperature region. When the atmospheric temperature of section B is low, the maximum temperature is decreased and the temperature rising rate is decreased. Meanwhile, when the atmospheric temperature of section B is high, the maximum temperature is increased and the temperature rising rate is also increased. Therefore, the atmospheric temperature of section B may be preferably set as high as possible. However, when the atmospheric temperature of section B is too high, the material may be heated to a significantly high temperature to deteriorate weldability. Therefore, it may be necessary to set a preferable range.

In this specification, a section from a section having an atmospheric temperature of about 930° C. or higher to a section having the highest atmospheric temperature (for example, a highest atmosphere maintaining temperature) is regarded as section B. In addition, a section subsequent from the section, having an atmospheric temperature lower than the highest atmospheric temperature, is regarded as a section distinguished from section B. For example, when section B has a first section B having an atmospheric temperature of about 930° C. and a second section B having an atmospheric temperature of about 950° C. and has a subsequent section having an atmospheric temperature of about 935° C., a section subsequent from the section having the atmospheric temperature of about 935° C., an atmospheric temperature condition lower than the highest atmospheric temperature of about 950° C., may be regarded as section C.

Accordingly, in the present disclosure, the atmospheric temperature of section B may be set to a range of about 930° C. to about 960° C. When the atmospheric temperature of section B is higher than about 960° C., there is a limitation of furnace equipment, but weldability may be deteriorated because the temperature is set to be significantly high in terms of alloying of a plating layer. In addition, when the atmospheric temperature of section B is less than about 930° C., the temperature rising rate may be significantly reduced to increase a time required to reach a target temperature and to deteriorate productivity due to an increase in cycle time.

In section B, not only the atmospheric temperature but also maintaining time of section B affects a temperature rising rate of a material and a maximum heating temperature of the material. For example, when the maintaining time of section B is too short, a sufficient temperature rising effect may not be obtained. In addition, when the maintaining time of section B is too long, the material may be maintained at a high temperature for a too long period of time to cause excessive alloying. Thus, the thickness of the diffusion layer may be increased to deteriorate weldability.

Therefore, although not necessarily limited, a lower limit of the maintaining time in section B may be about 0.5 minute or more such that an effect of improving productivity is obtained by a high temperature rising rate. Alternatively, an upper limit of the maintaining time in section B may be about 4.8 minutes to prevent poor weldability caused by excessive alloying. In this case, it should be noted that the maintaining time of section B refers to a time for which the material is maintained in only section B, and is conceptually distinguished from the cumulative in-furnace maintaining time to be described later.

Cumulative in-furnace maintaining time to section B may also affect the temperature rising rate of the material and the maximum heating temperature of the material in a high-temperature region. To increase the temperature to a sufficient temperature, the cumulative in-furnace maintaining time should be set to be long until the end of section B when the atmospheric temperature of section B is low and may be set to be short when the atmospheric temperature of section B is high.

The cumulative in-furnace maintaining time refers to a cumulative in-furnace maintaining time until the end of section B, rather than a cumulative in-furnace maintaining time of section B itself. For example, the cumulative in-furnace maintaining time in section B refers to a cumulative maintaining time, including all in-furnace heating maintaining times precedent to section B, for which heating is performed in the furnace until the end of section B (for example, the cumulative in-furnace maintaining time in section B refers to an in-furnace maintaining time in section A and section B when there is only section A before section B. Alternatively, the cumulative in-furnace maintaining time in section B refers to an in-furnace cumulative time including section A, the second B, and an additional section when the additional section is present between section A and section B). As described above, the cumulative maintaining time is important for the following reasons. For example, when the maintaining time of section A is short, the maintaining time of section B itself should be slightly long such that the temperature is increased to a sufficient temperature. Meanwhile, when the maintaining time of section A is long, the maintaining time of section B itself may be slightly short. For example, to achieve improved productivity through reduction of the heating time, a purpose of the present disclosure, it is necessary to consider not only the maintaining time of section B itself but also a time before section B.

The B section is aimed at rapid temperature rise, and avoiding staying at the high temperature of section B for a long period of time by increasing the maintaining time of section B is preferable in terms of weldability while obtaining the same temperature rising effect. Therefore, when the effect of the material thickness is not considered based on such a result (for example, based on the material thickness of 1.2 mm), cumulative in-furnace maintaining time to section B may be maintained to a maximum of 3.8 minutes or less when a temperature of section B is about 930° C.

Figure 5B:
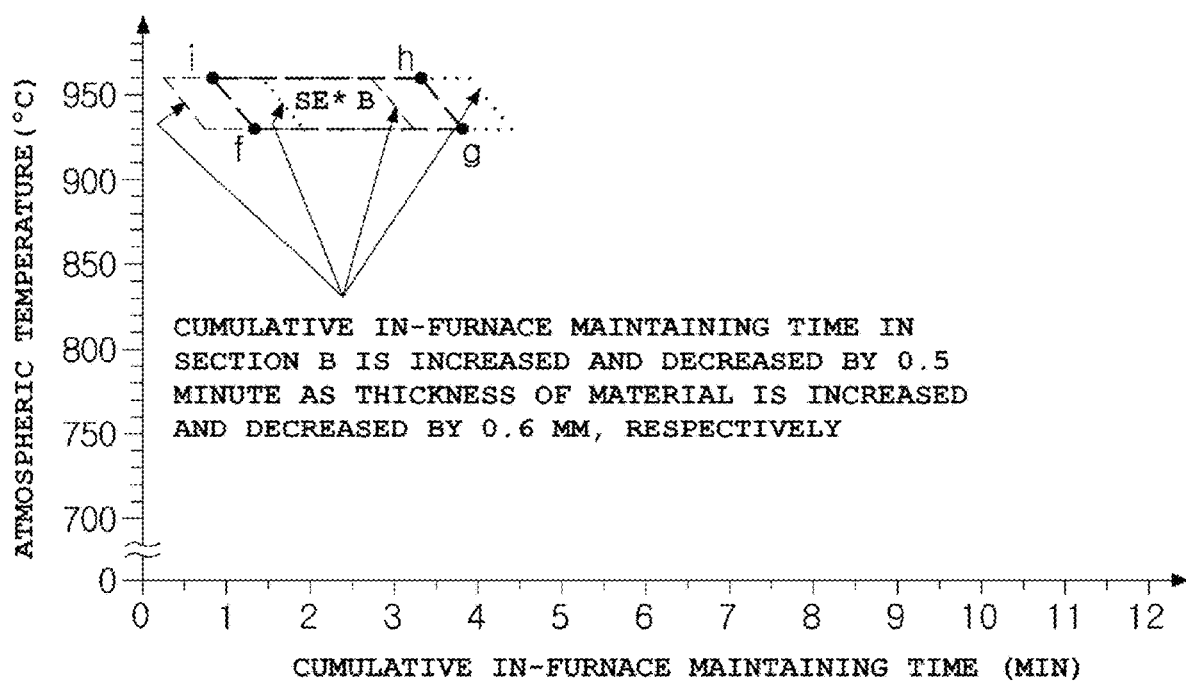

In addition, a heating pattern of the material is dependent on the thickness of the material. Accordingly, the present inventors made an analysis of temperature rise on various thicknesses to find out that it is necessary to adjust a cumulative in-furnace maintaining time to section B according to a thickness, as illustrated in FIG. 5B. For example, the cumulative in-furnace maintaining time to section B may have a range to be proportionally increased by about 0.5 minute as the thickness of the material is increases by 0.6 mm on the basis of the range specified by the figure 'fghi' of the material having a thickness of 1.2 mm in FIG. 3. Meanwhile, when the thickness of the material is decreased, the cumulative in-furnace maintaining time to section B may have a range to be proportionally decreased by about 0.5 minute as the thickness of the material is decreased by 0.6 mm.

Also the present inventors have made an intensive examination from a standpoint of further improving productivity and weldability to additionally find out that a heating atmospheric temperature of section B may be set under optimized conditions based on the case, in which a material has a thickness t of 1.5 mm, in consideration of an effect on the thickness of the material.

Specifically, according to an aspect of the present disclosure, when the thickness t is 1.5 mm or less, the atmospheric temperature of section B may be more than about 930° C. to less than about 940° C. Section B should be set to a high atmospheric temperature to obtain a rapid temperature rise of the material, but heating may be performed at an atmospheric temperature, which is not too high, in consideration of a slight change in in-furnace maintaining time resulting from a work abnormality action in the actual production industry. Accordingly, when the thickness of the material is 1.5 mm or less, it is most advantageous, in terms of significantly reducing possibility of poor weldability, to control the atmospheric temperature of section B within the above-described range. Meanwhile, when the thickness t is 1.5 mm or less, the atmospheric temperature of section B may be, in more detail, more than about 930° C. to less than about 935° C. and, inmost detail, about 931° C. to 934° C. Thus, an effect of significantly reducing poor weldability may be further improved.

According to another aspect of the present disclosure, when the thickness t is greater than 1.5 mm, the atmospheric temperature of section B may be more than about 930° C. to less than about 950° C. Section B should be set to a high atmospheric temperature to obtain a rapid temperature rise of the material, but heating may be performed at an atmospheric temperature, which is not too high, in consideration of a slight change in in-furnace maintaining time resulting from a work abnormality action in the actual production industry. Accordingly, when the thickness of the material is greater than 1.5 mm, it is most advantageous, in terms of significantly reducing possibility of poor weldability, to control the atmospheric temperature of section B within the above-described range. This takes into account the fact that, when the thickness of the material is increased, the temperature of section B should be slightly higher than a temperature of a thin material. Meanwhile, when the thickness t is greater than 1.5 mm, the atmospheric temperature of section B may be, in more detail, more than about 930° C. to less than about 945° C. and, in most detail, about 931° C. to 940° C. Thus, weldability may be further improved.

According to another aspect of the present disclosure, when the thickness t is greater than 1.5 mm, the atmospheric temperature of section B may be controlled to be more than about 940° C. to 960° C. or less from a standpoint of improving productivity by a rapid temperature rise and bendability. To secure stable bendability, overall cumulative in-furnace maintaining time is preferably not too short, that is, as long as possible. However, the in-furnace maintaining time is preferably short from a viewpoint of productivity. Therefore, to satisfy both productivity and bendability, the temperature of section B may be increased to secure a rapid temperature rise, so that a more stable austenite structure may be secured in a heating process without increasing the overall cumulative maintaining time. As a result, more excellent bendability may be secured.

Alternatively, according to an aspect of the present disclosure, a maximum atmospheric temperature Tb (for example, a maximum atmosphere maintaining temperature) of section B may be about 938° C. or less, in more detail, about 935° C. or less, and, in most detail, about 934° C. or less. Thus, both excellent productivity and weldability may be implemented.

Heating in section C satisfies conditions specified by a figure 'jklm' having cumulative in-furnace maintaining times and atmospheric temperature coordinates of approximately $$j\left(3.7 + \frac{t-1.2}{0.6} \text{ min, } 870° \text{ C.}\right), k\left(11.7 + \frac{t-1.2}{0.6} \times 2 \text{ min, } 870° \text{ C.}\right),$$

$$l\left(7.03 + \frac{t-1.2}{0.6} \times 2 \text{ min, } 940° \text{ C.}\right), \text{ and}$$

$$m\left(2.53 + \frac{t-1.2}{0.6} \text{ min, } 940° \text{ C.}\right).$$

A highest atmospheric temperature (for example, a maximum atmosphere maintaining time) in section C is lower than a highest atmospheric temperature (for example, a maximum atmosphere maintaining time) in section B. For example, subsequently to section B, an atmospheric temperature and a cumulative in-furnace maintaining time during heating in section C satisfy the conditions specified by a figure 'jklm' by including even an effect of the thickness of the material, and thus, both excellent productivity and weldability may be implemented. In this case, a unit of the coordinates of the figure 'jklm' is j(3.7 [min]+{(t [mm]−1.2 [mm])/0.6 [mm]} [min], 870 [° C.]), k(11.7 [min]+{(t [mm]−1.2 [mm])/0.6 [mm]}×2 [min], 870[° C.]), l(7.03 [min]+{(t [mm]−1.2 [mm])/0.6 [mm]}×2 [min], 940[° C.]), m(2.53 [min]+{(t [mm]−1.2 [mm])/0.6 [mm]} [min], 940 [C]).

The heating in the C section affects a final maintaining temperature of the material. A maximum atmospheric temperature of section C is set to be lower than the maximum atmospheric temperature of section B. This is because, when the atmospheric temperature of section C is as high as in section B, the material is heated at a high temperature for a long period of time to deteriorate weldability. For example, the heating in section B is set to a high temperature because it is mainly aimed at increasing the temperature rising rate of the material, and the heating in section C is preferably set to a temperature, which is not too high or low, because it is aimed at controlling the final maintaining temperature of the material.

When the atmospheric temperature of section C is set to less than about 870° C., a material take-out temperature is significantly low, so that it may be cooled to a significantly low temperature in subsequent conveying and pre-forming cooling operations to significantly decrease a temperature during the forming. As a result, formability may be deteriorated.

Alternatively, according to an aspect of the present disclosure, the atmospheric temperature of section C may be lower than the atmospheric temperature of section B in terms of improving weldability. Alternatively, the atmospheric temperature of section C may be set to be lower than a lowest atmospheric temperature (for example, a lowest atmosphere maintaining temperature) in section B. For example, when a first section B at about 930° C. and a second section B at 960° C. are included as section B, section C is about 870° C. or higher but may be set to lower than about 930° C. (for example, less than 930° C.), the first section B.

According to an aspect of the present disclosure, the maximum atmospheric temperature of section C may be set to about Tb−20° C. or less based on the maximum atmospheric temperature Tb of section B, or may be set to a range of about Tb−30° C. or less (in this case, the maximum atmospheric temperature refers to a maximum atmosphere maintaining temperature, as described above). The greater a difference in temperatures between section B and section C, the greater an effect of improving weldability due to a rapid temperature rise and suppression of an increase in the thickness of the diffusion layer. However, to increase such a difference, the temperature of section B should be increased while the temperature of section C should be decreased. Therefore, a range is significantly narrowed in terms of setting work conditions and it takes significantly long time to reach a temperature to section C. Accordingly, the present inventors confirmed that, when the difference in temperatures between section B and section C is about 20° C., the material reaches the temperature of section C within a short period of time (for example, about 30 seconds or less). Accordingly, the difference in temperatures between section B and section C is, in most detail, about 20° C. or more and section C is, in most detail, about 870° C. or more.

The cumulative in-furnace maintaining time until the end of section C also affects the final maintaining temperature. When the atmospheric temperature in the C section is low, the cumulative in-furnace maintaining time until the end of the C section should be set to be long. When the atmospheric temperature of section C is high, the cumulative in-furnace maintaining time until the end of section C may be set to be short. The cumulative in-furnace maintaining time until the end of section C also refers to a cumulative in-furnace maintaining time until section C, rather than a maintaining time of section C itself. In this case, the above descriptions may be equally applied to the cumulative in-furnace maintaining time.

As described above, the cumulative maintaining time is important for the following reasons. For example, when the in-furnace maintaining time just before the C section is short, the maintaining time of section C itself needs to be slightly long for sufficient alloying. Meanwhile, when the in-furnace maintaining time just before section C is long, it is necessary to consider that the maintaining time of section C itself may be somewhat short. For example, although improvement of productivity, the purpose of the present disclosure, is implemented, not only the maintaining time of section C itself but also a time before section C needs to be considered for sufficient alloying. The cumulative in-furnace maintaining time until the end of section C was derived by analyzing various embodiments to be described in detail later.

Therefore, according to an aspect of the present disclosure, based on 1.2 mm, a thickness of a material, without considering an effect of the thickness of the material, the cumulative in-furnace maintaining time until the end of section C may be about 3.7 to 11.7 minutes when an atmospheric temperature is about 870° C. and may be about 2.53 to 7.03 minutes when an atmospheric temperature is about 940° C. Specifically, in the case in which the atmospheric temperature of section C is high, when the cumulative in-furnace maintaining time until the end of section C is too long, heating time may be significantly increased to deteriorate productivity and weldability. Meanwhile, when the atmospheric temperature of section C is low, the overall cumulative in-furnace maintaining time to section C should be increased to compensate for the low atmospheric temperature of section C.

Figure 5C:
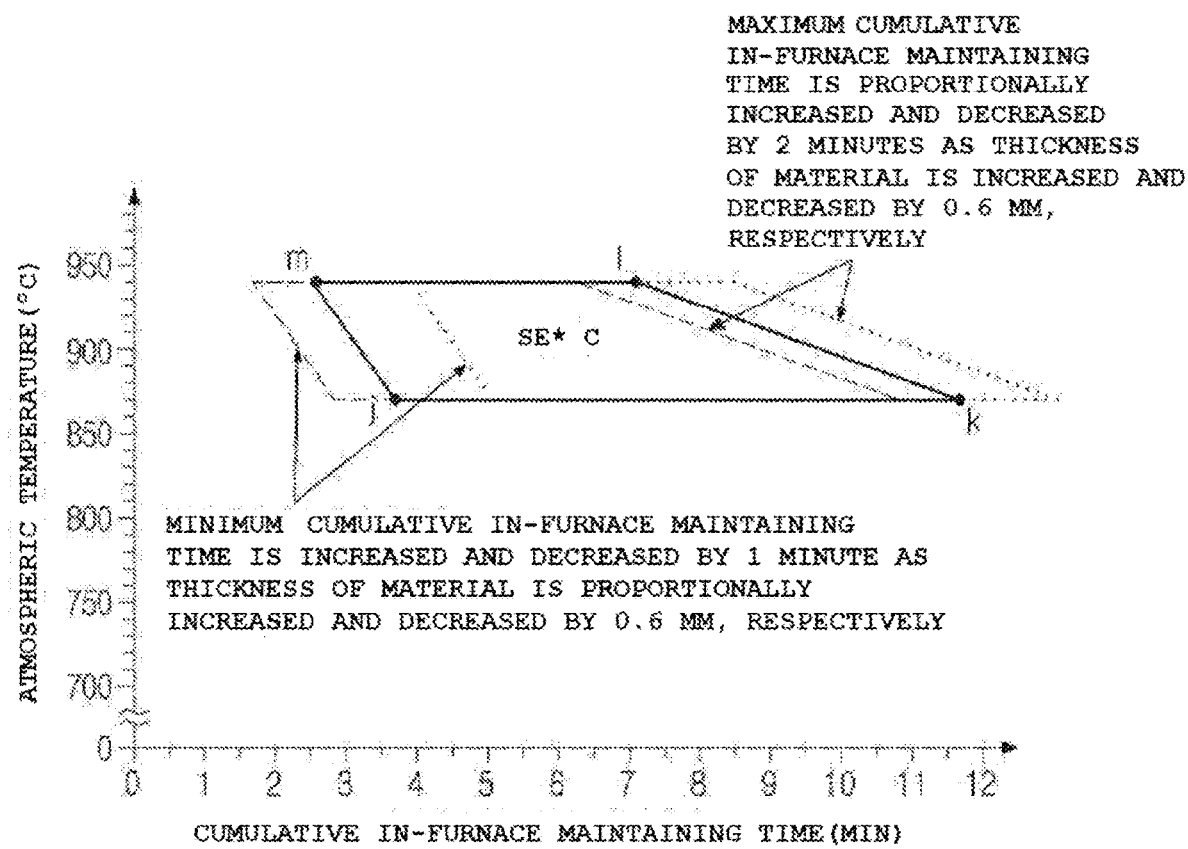

In addition, similarly to section B, a temperature rising pattern of the material in section C is dependent on the thickness of the material. Therefore, the present inventor made an analysis of temperature rise on various thicknesses to confirm that it was necessary to adjust the cumulative in-furnace maintaining time until the end of section C depending on a thickness, as illustrated in FIG. 5C.

For example, the cumulative in-furnace maintaining time until the end of section C may have a range in which a minimum maintaining time is proportionally increased by one minute and a maximum maintaining time is proportionally increased by two minutes as the thickness of the material is increases by 0.6 mm on the basis of the range specified by the figure 'jklm' of the material having a thickness of 1.2 mm in FIG. 3. Meanwhile, when the thickness of the material is decreased, the cumulative in-furnace maintaining time until the end of section C may have a range in which a minimum maintaining time is proportionally decreased by one minute and a maximum maintaining time is proportionally decreased by two minutes as the thickness of the material is decreased by 0.6 mm.

Therefore, the present disclosure may meet the cumulative in-furnace maintaining time and atmospheric temperature specified by the figure 'jklm' reflecting even the above-described effect of thickness.

According to an aspect of the present disclosure, the heating in section C may be performed at an atmospheric temperature of about 935° C. or less, in more detail, at an atmospheric temperature of about 930° C. or less. Alternatively, a maximum atmospheric temperature (for example, a maximum atmosphere maintaining temperature) in section C may be about 935° C. or less, in more detail, about 930° C. or less. Thus, productivity and weldability may be further improved.

According to an aspect of the present disclosure, the maintaining time in section C may be about 0.5 minutes or more. When the maintaining time in section C is less than about 0.5 minutes, it may not reach a final maintaining temperature, but the preset disclosure is not limited thereto.

According to an aspect of the present disclosure, when the thickness t is 1.5 mm or less, the atmospheric temperature of section C may be about 870° C. or more to less than 880° C. This is because since alloying of the plating layer is performed significantly more rapidly when the material is maintained at a high temperature during heating, it is most advantageous, in terms of weldability, to maintain the temperature of section C, the final maintaining temperature, at about 870° C. or more to less than 880° C.

Alternatively, according to an aspect of the invention, when the thickness t is greater than 1.5 mm, the atmospheric temperature of section C may be about 870° C. or more to less than 900° C. This is because since alloying of the plating layer is performed significantly more rapidly when the material is maintained at a high temperature during heating, it is most advantageous, in terms of weldability, to maintain the temperature of section C, the final maintaining temperature, at about 870° C. or more to less than 900° C. when the thickness of the material is greater than 1.5 mm. This takes into account the fact that, when the thickness of the material is increased, the temperature of section C should be slightly higher than a temperature of a thin material.

According to one aspect of the present disclosure, for example, the maintaining time in each of section B and section C may be, in detail, about 0.5 minute to obtain an effect that the present disclosure desires. In this case, the maintaining time in each of section B and section C refers to maintaining time of each of section B itself and section C itself, rather than cumulative time. When the maintaining time in at least one of section B and section C is less than about 0.5 minutes, it may be difficult to expect effects of rapid temperature rise in section B and reaching a low final maintaining temperature in section C, but the present disclosure is not necessarily limited thereto.

According to an aspect of the present disclosure, the heating operation may be performed such that a value of the following Relational Expression 2 satisfies 2 or more. In this case, since the value of Relational Expression 2 is an empirical value, a unit is not necessarily determined.

$$\sum_{n=1}^{x}\left[\left\{(T_n - 870) \times \frac{t_n}{t_{total}} \times 0.1334\right\} \times k\right] \div t$$

where $T_n$ denotes a heating furnace atmospheric temperature in an n-th section in a conveying direction of a blank and a unit thereof is degrees Celsius (° C.), $t_n$ denotes a heating furnace maintaining time in the n-th section in the conveying direction of the blank and a unit thereof is minute, $t_{total}$ denotes total maintaining time in the heating furnace and a unit thereof is minute, x denotes the number of sections maintained at a specific atmospheric temperature in the heating furnace, k is an integer of 3 in the case of a final section in section B, an integer of −1 in the case in which a section subsequent to section B, and an integer of 1 in the other cases, and t denotes a thickness of the blank and a unit thereof is millimeters (mm).

The n-th section in the heating furnace refers to a section maintained at a specific atmospheric temperature, and refers to a section present in n-th in the conveying direction of the blank. The respective sections, present in the conveying direction of the blank, may be divided by atmospheric temperature. In this case, the furnace maintaining time in the n-th section refers to maintaining time of each section itself, rather than cumulative maintaining time in the heating furnace.

In this case, the same descriptions may be applied to the descriptions of the heating furnace and each section, except for maintaining time in each section to be described later.

In addition, the maintaining time in each section may refer to maintaining time in each heating zone corresponding to each section in a heating furnace, including a plurality of heating zones described above, in which atmospheric temperatures in the heating zones may be controlled to be distinguished from each other. For example, as a case in which a single heating zone corresponds to a single section, time for which the material is maintained in the single heating zone may refer to time from a point in time at which a blank, a material, is injected to a point in time at which the blank is removed of the single heating zone.

As described above, since section B refers to a section from a section having an atmospheric temperature of about 930° C. or more to a section having a highest atmospheric temperature, a final section of section B refers to a section having the highest atmospheric temperature (for example, highest atmosphere maintaining temperature). In this case, the term "a section subsequent to section B" refers to a section, present and distinguished by a heating furnace atmospheric temperature after section B in the conveying direction of the blank, except for section B.

As an example, a description will be given of the case in which there are section A (atmospheric temperature: T1, maintaining time: t1), section B (atmospheric temperature: T2, maintaining time: t2), a first section C (atmospheric temperature: T3, maintaining time: t3), and a second section C (atmospheric temperature: T4, maintaining time: t4). In this case, the above-described Relational Expression 2 may be $[\{(T1-870) \times t1/t_{total} \times 0.1334 \times 1\} + \{(T2-870) \times t2/t_{total} \times 0.1334 \times 3\} + \{(T3-870) \times t3/t_{total} \times 0.1334 \times (-1)\} + \{(T4-870) \times t4/t_{total} \times 0.1334 \times (-1)\}]/t$.

The present inventors have made an intensive examination of patterns of temperature and time of the heating furnace during a heating process to conduct additional research into a method of further improving shape precision of a product, in addition to productivity, weldability, and formability.

For example, the present inventors conducted research into an effect on a formed member based on a value $V_{cal}$, obtained by multiplying a ratio of time occupied by each section in the overall process by a difference in the heating atmospheric temperature based on 870° C., and 0.1334. Specifically, since the value $V_{cal}$ is preferably large in terms of productivity in a section before a section maintained at the highest atmospheric temperature, the value $V_{cal}$ has a positive sign (+) (for example, k corresponds to +1). Since an effect of the section maintained at the highest atmospheric temperature is greatest, the value Vcal is affected by (+3) times (for example, k corresponds to an integer of 3). In addition, since the value Vcal is preferably small to reduce a thickness of a diffusion layer in terms of weldability in a section subsequent to section B, the value Vcal has a negative sign (−). The present inventor found that by satisfying the value of Relational Expression 2 or more, obtained by dividing the sum of the values $V_{cal}$ in the respective sections by t in consideration of an effect of a thickness, it could reduce warpage of a product when the product was removed of a combination of furnace sections having appropriate conditions and was then cooled in air. Thus, in addition to the above-described productivity, weldability, and formability, shape precision of the product may be further improved.

In addition, the present inventors found the following through detailed process analysis of a cooling process in a hot press forming process. A heated blank is removed of a heating furnace, and then conveyed to a mold mounted on a press. The blank is cooled by air cooling during such a conveying process. After the blank is seated on a lower mold portion, a blank supply jig evades within a process working range, and then a press slide begins to descend. An upper mold portion starts to be in contact with the blank after a predetermined time elapses. Forming process is substantially started after the upper mold portion is in contact with the seated blank. As describe above, a certain time is required before forming process is performed after blank is seated. During this time, the blank is air-cooled overall and is brought into contact with a structure such as a lifter, supporting a lower mold portion or a blank of the lower mold portion, so that quenching occurs in the contact portion. Accordingly, the present inventors found that not only time required for a conveying process, in which air cooling mainly occurs, but also time required before forming is performed after the blank is seated needs to be significantly reduced to secure overall safe formability. Since it is well known that quenching is important in securing physical properties in a state in which the mold is completely in close contact therewith after forming is finished, an additional description of the quenching will be omitted. In the present disclosure, the following analysis was made because the present inventors found that it is important to manage cooling time during conveying and time required before forming is performed after the blank is seated, in terms of securing physical properties and formability.

Figure 6:
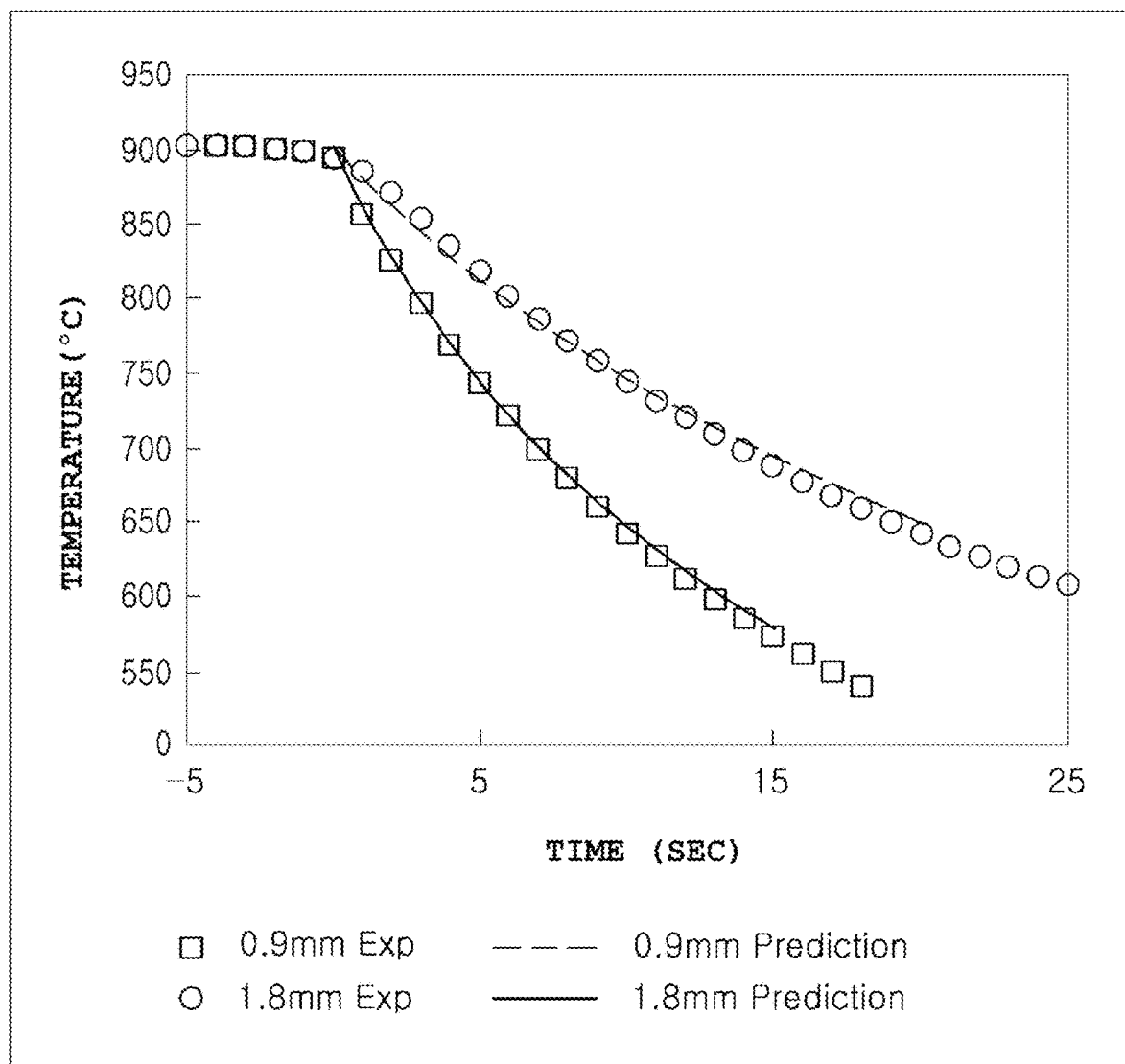
FIG. 6 is a graph illustrating a comparison between experimental values and analysis values for temperature changes depending on times for which an aluminum plating material having a thickness of 0.9 mm and an aluminum plating material having a thickness of 1.8 mm are cooled in air after they are extracted from a heating furnace.

FIG. 6 is a graph illustrating a comparison between experimental values and analysis values for temperature changes depending on times for which an aluminum plating material having a thickness of 0.9 mm and an aluminum plating material having a thickness of 1.8 mm are cooled in air after they are extracted from a heating furnace. As can be seen from FIG. 6, the analysis values predict the experimental values well.

In the present disclosure, such an analysis technique was used to intensively examine a relationship between thicknesses of various materials, a furnace take-out temperature, and the sum of time required for conveying and seating a blank and time required before forming is performed after the blank is seated. As a result of intensive examination, it was found that Relational Expression 1 should be satisfied.

$$T \leq 8.2 \times t + (\text{temp} - 900)/30 \qquad \text{Relational Expression 1:}$$

where T denotes a sum of time required for conveying and seating a blank and time required before forming is performed after the blank is seated and a unit thereof second (s), t denotes a thickness of a material and a unit thereof is millimeters (mm), and temp denotes a furnace extraction temperature and a unit thereof is degrees Celsius (° C.).

Since Relational Expression 1 is an empirically obtained value, a unit may not be necessarily determined, and it is sufficient as long as the unit of T is second (s), the unit of t is millimeters (mm), and the unit of temp is degrees Celsius (° C.).

According to an aspect of the present disclosure, T may be greater than about 10 seconds, in more detail, about 11 seconds or more. For example, even when T is greater than about 10 seconds, excellent formability may be secured. Therefore, the present disclosure may be applied to even equipment including a conveying device having slightly low speed. Accordingly, since unnecessary equipment investment in not required, economical feasibility may be secured.

According to an aspect of the present disclosure, although not necessarily limited, a thickness t of a material may range from about 0.6 to about 2.6 mm. When the thickness t of the material is less than about 0.6 mm, the material is significantly thin, causing sagging, or the like, to occur in a continuous heating furnace during conveying. Meanwhile, when the thickness t of the material is greater than about 2.6 mm, the material is too thick to easily manufacture an aluminum plating material.

As described above, cooling includes air cooling during a conveying process and cooling by a lower mold portion before forming is performed after a blank is seated. In a process before the forming is performed after the blank is seated, a portion in contact with a structure such as a lifter, supporting a lower mold portion or a blank of the lower mold portion, is cooled more rapidly than a non-contact and air-cooled portion. Therefore, the present inventor found that in terms of air cooling of the entire blank, it is sufficient to satisfy only Relational Expression 1-1 [$T \leq 8.2 \times t$], but it is important to suppress an increase in the time required before forming is performed after the blank is seated on the lower mold portion and is then brought into contact with an upper mold portion.

Accordingly, the time required before forming is performed after the blank is seated may be 2 seconds or less. After heating a material having a thickness of 1.2 mm and extracting the heated material at a temperature of 900° C., the present inventors observed temperatures of a portion in contact with the lifter under a condition in which the blank is conveyed for eight seconds and is brought into contact with a lower lifter for one second, a condition in which the blank is conveyed for seven seconds and is brought into contact with the lower lifter for two seconds, and a condition in which the blank is conveyed for six seconds and is brought into contact with the lower lifter for three seconds. As a result, it is confirmed that when the blank is brought into contact with the lower lifter for more than 2 seconds, a corresponding portion is further cooled by 50° C. or more, as compared with the non-contact portion. Therefore, when cooling time only by the lower mold portion of the mold before the upper mold portion of the mold is brought into contact therewith prior to a forming process (for example, time required before forming is performed after the blank is seated) is greater than two seconds, a portion of the blank not in contact with the lower mold portion of the mold is cooled to a level of 700° C. Thus, a portion of the blank in contact with the lower mold portion of the mold may be cooled to a temperature level of 650° C. determined to be unable to work in management of a conventional hot press forming process. Accordingly, there is possibility that the blank is scrapped without performing a forming operation.

Therefore, the time required before forming is performed after the blank is seated may be controlled to be, in most detail, two seconds or less while performing a process to satisfy Relational Expression 1 before the heated blank is brought into contact with the upper mold portion to start forming.

In addition, according to an aspect of the present invention, a thickness of a plating layer of the blank may be 20 μm or more. When the thickness of the plating layer of the blank is less than 20 μm, heating may be performed while the plating layer of the blank is thin, and alloying may be rapidly performed to allow the diffusion layer to be more rapidly increased. For example, when the amount of plating is decreased, a thickness increase rate of the diffusion layer may be increased to make it difficult to expect desired physical properties of the present disclosure. Therefore, the thickness of the plating layer of the blank may be controlled to be, in detail, 20 μm or more. Alternatively, the thickness of the plated layer of the blank may be, in more detail, 25 μm or more, and thus, an increase in the thickness of the diffusion layer may be suppressed to further improve weldability. Although an upper limit of the thickness of the plating layer of the blank is not necessarily limited, it may be 33 μm or less, a thickness widely applied in industry, because an alloying rate of the plating layer may be reduced.

According to an aspect of the present disclosure, a thickness of a diffusion layer of the formed member may be 15 μm or less. Since the diffusion layer has high resistance due to poor conductivity, local heat generation occurs significantly during welding when the diffusion layer is too thick, so that spatter may occur. Therefore, the thickness of the diffusion layer may be controlled to be, in detail, 15 μm or less. The diffusion layer of the formed member may refer to a layer including an intermetallic compound of Fe and Al, and examples of the intermetallic compound of Fe and Al may be FeAl, $Fe_3Al$, and the like. The diffusion layer of the formed member may further include some components among components derived from the plating layer.

According to an aspect of the present disclosure, a thickness of an alloy layer of the formed member may be 27 to 50 μm. When the thickness of the alloy layer of the formed member is less than 27 μm, corrosion resistance may be insufficient. When the thickness of the alloy layer is more than 50 μm, there is a possibility that seizure of the plating layer may occur intensively in the mold during forming. From the standpoint of further improving the above-described effect, the thickness of the alloy layer of the formed member may be, in more detail, 35 to 50 μm. The thickness of the alloy layer of the formed member refers to overall thickness of coating including the diffusion layer.

According to an aspect of the present disclosure, a ratio of the thickness of the diffusion layer of the formed member to the thickness of the alloy layer of the formed member (thickness of diffusion layer/thickness of alloy layer) may be 0.5 or less, in more detail, 0.33 or less. The above-described conditions may be satisfied to prevent weldability from being deteriorated by spatter occurring as the thickness of the diffusion layer is significantly increased, as compared to the thickness of the alloy layer of the formed member.

EXAMPLE

Hereinafter, the present disclosure will be described in more detail through exemplary embodiments. However, an example embodiment below is intended to describe the present disclosure in more detail through illustration thereof, but not to limit the right scope of the present disclosure, because the right scope thereof is determined by the contents written in the appended claims and reasonably inferred therefrom.

Experimental Example 1

A plated steel sheet was obtained by dipping a base steel sheet in a plating bath Al—Si9%-Fe3%. The base steel sheet comprised, by weight percentage (wt %), 0.22% of carbon (C), 0.3% of silicon (Si), 1.2% of manganese (Mn), 0.2% of chromium (Cr), 0.03% of aluminum (Al), 0.01% of phosphorus (P), 0.001% of sulfur (S), N: 0.003% of nitrogen (N), 0.003% of boron (B), and a balance of iron (Fe) and unavoidable impurities. For an aluminum plated steel sheet having a thickness of 1.2 mm thus obtained, a blank was heated in a heating furnace to satisfy conditions listed in Tables 1 and 2 below, conveyed between an upper mold portion and a lower mold portion of a mold, and then cooled by seating the lower mold, formed and removed to manufacture a hot press-formed member. In this case, in a heating furnace, having a plurality of heating zones, in which atmospheric temperatures was controlled to be distinguished from each other in the respective heating zones, atmosphere maintaining temperatures in the respective zones were measured using thermocouple to list an atmosphere maintaining temperature in each section of Table 1 below. In addition, the maintaining time in each section was listed in Table 1 below by measuring a time from a point in time, at which the blank, a material, is charged, to a point in time at which the blank is removed, based on each heating zone corresponding each section. In addition, cumulative maintaining time in each section was listed in Table 1 below by measuring the point in time, at which the blank, a material, is injected into the heating furnace, to a point in time at which the blank, a material, is removed from each heating zone corresponding to each heating furnace.

In each inventive example and each comparative example listed in Tables 1 and 2 below, properties were evaluated based on the following criteria.

<Time Required to Reach 900° C.>

With a result obtained by calculating temperatures of materials injected into a heat furnace using the above-mentioned analysis method, classification was performed based on time required to reach 900° C., and productivity was determined.

○: case in which time required to reach 900° C. was 180 seconds or less x: case in which time required to reach 900° C. was greater than 180 seconds <Weldability>

Weldability was classified as follows, based on a welding current range value during resistance welding (a range value between a minimum current value, at which a minimum nugget diameter may be secured, and a maximum current value at which spatter occurs). In this case, a welding current range used a correlation equation between a thickness of a diffusion layer and the welding current range.

AA: case in which the welding current range was 2.3 KA or more

A: case in which the welding current range was 2.0 KA or more to less than 2.3 KA A−: case in which the welding current range was 1.5 KA or more to less than 2.0 KA B: case in which the welding current range was 1.0 KA or more to less than 1.5 KA C: case in which the welding current range was less than 1.0 KA <Formability>

Formability was classified as follows, based on a blank temperature of 650° C. before forming, a criterion of management for suppressing occurrence of defective products.

○: case in which the blank temperature immediately before forming was 650° C. or more x: case in which the blank temperature immediately before forming was less than 650° C.

TABLE 1

| No. | Thickness of Material [mm] | Section A Temperature [° C.] | Section A Time [Min] | Section B Temperature [° C.] | Section B Time [Min] | Section B Cumulative Maintaining Time [Min] | Section C Temperature [° C.] | Section C Time [Min] | Section C Cumulative Maintaining Time [Min] | Classification |
|---|---|---|---|---|---|---|---|---|---|---|
| 1 | 1.2 | 870 | 1.0 | 940 | 2.0 | 3.0 | 900 | 1.5 | 4.5 | IE 1 |
| 1A | 1.2 | 900 | 1.0 | 900 | 2.0 | 3.0 | 900 | 1.5 | 4.5 | CE 1 |
| 1B | 1.2 | 940 | 1.0 | 940 | 2.0 | 3.0 | 940 | 1.5 | 4.5 | CE 2 |
| 1C | 1.2 | 870 | 1.0 | 900 | 2.0 | 3.0 | 940 | 1.5 | 4.5 | CE 3 |
| 2 | 1.2 | 700 | 1.0 | 940 | 2.0 | 3.0 | 900 | 1.5 | 4.5 | CE 4 |
| 2B | 1.2 | 800 | 1.0 | 940 | 2.0 | 3.0 | 900 | 1.5 | 4.5 | IE 2 |
| 2A | 1.2 | 750 | 1.0 | 940 | 2.0 | 3.0 | 900 | 1.5 | 4.5 | IE 3 |
| 3 | 1.2 | 750 | 1.5 | 940 | 1.5 | 3.0 | 900 | 1.5 | 4.5 | CE 5 |
| 3A | 1.2 | 800 | 1.5 | 940 | 1.5 | 3.0 | 900 | 1.5 | 4.5 | CE 6 |
| 3B | 1.2 | 900 | 1.5 | 940 | 1.5 | 3.0 | 900 | 1.5 | 4.5 | IE 4 |
| 4 | 1.2 | 870 | 1.0 | 920 | 2.0 | 3.0 | 900 | 1.5 | 4.5 | CE 7 |
| 4A | 1.2 | 870 | 1.0 | 930 | 2.0 | 3.0 | 900 | 1.5 | 4.5 | IE 5 |
| 5 | 1.2 | 900 | 1.5 | 933 | 1.5 | 3.0 | 900 | 1.5 | 4.5 | IE 6 |
| 6 | 1.2 | 750 | 1.0 | 940 | 2.0 | 3.0 | 900 | 1.5 | 4.5 | CE 8 |

IE: Inventive Example
CE: Comparative Example

TABLE 2

| No. | S1* | S2* | Value of Relational Expression 1 | The initial time required to reach 900° C. [Sec] | Productivity | Weldability | Formability | Classification |
|---|---|---|---|---|---|---|---|---|
| 1 | 1.0 | 9 | 9.8 | 167 | ○ | A | ○ | IE 1 |
| 1A | 1.0 | 9 | 9.8 | 205 | x | A | ○ | CE 1 |
| 1B | 1.0 | 9 | 11.2 | 157 | ○ | C | ○ | CE 2 |
| 1C | 1.0 | 9 | 11.2 | 186 | x | B | ○ | CE 3 |
| 2 | 1.0 | 9 | 9.8 | 200 | x | A | ○ | CE 4 |
| 2B | 1.0 | 9 | 9.8 | 176 | ○ | A | ○ | IE 2 |
| 2A | 1.0 | 9 | 9.8 | 178 | ○ | A | ○ | IE 3 |
| 3 | 1.0 | 11 | 9.8 | 225 | x | A | x | CE 5 |
| 3A | 1.0 | 9 | 9.8 | 210 | x | A | ○ | CE 6 |
| 3B | 1.0 | 9 | 9.8 | 166 | ○ | A | ○ | IE 4 |
| 4 | 1.0 | 9 | 9.8 | 184 | x | A | ○ | CE 7 |
| 4A | 1.0 | 9 | 9.8 | 177 | ○ | A | ○ | IE 5 |
| 5 | 1.0 | 9 | 9.8 | 171 | ○ | AA | ○ | IE 6 |
| 6 | 3.0 | 9 | 9.8 | 178 | ○ | A | x | CE 8 |

IE: Inventive Example
CE: Comparative Example

S1*: time required before forming was performed after the blank was seated [seconds]

S2*: sum of time required for conveying and seating and time required before forming was performed after the blank was seated [second]

As can be seen from Tables 1 and 2, as compared with Comparative Example 1 in which an entire heating furnace was set to a single atmospheric temperature of 900° C., in Inventive Example l and Inventive Example 2, time required to reach a final maintaining temperature could be further reduced. Thus, it was confirmed that overall cycling time could be reduced. Therefore, it was confirmed that productivity was further improved.

In Inventive Examples 3 to 6 satisfying all of heating conditions in a heating furnace, cooling conditions by a lower mold portion and Relational Expression 1, it was confirmed that productivity, weldability, and formability were all excellent.

In Inventive Example 6 in which an atmospheric temperature of section B satisfied more than 930° C. to less than 940° C., it was confirmed that weldability was further improved than the other example embodiments.

In Comparative Example 2 in which the entire heating furnace was set to a uniform temperature of 940° C., a faster temperature rising effect could be obtained, but a final maintaining temperature was maintained at a high temperature of 940° C. to deteriorate weldability.

In Comparative Example 3 in which a highest temperature of 940° C. was disposed in a rearmost portion using another method, time required to reach a final maintaining temperature was significantly long, and thus, productivity was deteriorated. In addition, a final temperature reached 940° C. to deteriorate weldability.

In Comparative Example 4 in which only an atmospheric temperature of section A was changed to 700° C., time required to reach 900° C. was 200 seconds, and thus, temperature rise was not finished until the end of section B. Therefore, productivity was deteriorated.

In Comparative Examples 5 to 8, not satisfying at least one of heating conditions in a heating furnace, cooling condition by a lower mold portion and Relational Expression 1, it was confirmed that at least one of productivity, weldability, and formability was deteriorated.

Experimental Example 2

Except for a change to conditions of Tables 3 and 4 below, a hot press-formed member was manufactured in the same manner as in Experimental Example 1 described above. In addition, except that productivity was evaluated by the following method, characteristics were evaluated in the same criteria as in Experimental Example 1 described above.

<Whether Additional Heating Process is Required>

With a result obtained by calculating temperatures of materials injected into a heat furnace using the above-mentioned analysis method, classification was performed as follows to determine productivity.

○: case in which a temperature of a material reached an atmospheric temperature of the set section C when the material is removed x: case in which the temperature of the material did not reach the atmospheric temperature of the set section C when the material was removed, and case in which an additional heating process was required to secure target properties

TABLE 3

| No. | Thickness of Material [mm] | Section A Temperature [° C.] | Section A Time [Min] | Section B Temperature [° C.] | Section B Time [Min] | Section B Cumulative Maintaining Time [Min] | Section C Temperature [° C.] | Section C Time [Min] | Section C Cumulative Maintaining Time [Min] | Classification |
|---|---|---|---|---|---|---|---|---|---|---|
| 7 | 1.8 | 900 | 0.5 | 950 | 2.0 | 2.5 | 935 | 2.0 | 4.5 | IE 7 |
| 8 | 1.2 | 900 | 0.5 | 930 | 0.5 | 1.0 | 900 | 2.5 | 3.5 | CE 9 |
| 9 | 1.2 | 900 | 0.5 | 930 | 1.0 | 1.5 | 900 | 2.0 | 3.5 | IE 8 |
| 10 | 1.2 | 900 | 0.5 | 930 | 1.0 | 1.5 | 900 | 1.5 | 3.0 | CE 10 |
| 11 | 1.2 | 900 | 0.2 | 960 | 0.5 | 0.7 | 930 | 2.5 | 3.2 | CE 11 |
| 12 | 1.2 | 900 | 0.2 | 960 | 0.8 | 1.0 | 930 | 2.2 | 3.2 | IE 9 |
| 13 | 1.2 | 900 | 0.2 | 960 | 0.8 | 1.0 | 930 | 1.5 | 2.5 | CE 12 |
| 14 | 1.2 | 750 | 1.0 | 930 | 1.0 | 2.0 | 870 | 1.0 | 3.0 | CE 13 |
| 15 | 1.2 | 750 | 1.0 | 930 | 1.0 | 2.0 | 870 | 2.0 | 4.0 | IE 10 |
| 16 | 1.2 | 900 | 0.5 | 950 | 1.0 | 1.5 | 900 | 2.0 | 3.5 | IE 11 |
| 17 | 1.8 | 900 | 0.5 | 950 | 1.0 | 1.5 | 900 | 2.0 | 3.5 | CE 14 |
| 18 | 1.8 | 900 | 0.5 | 950 | 2.0 | 2.5 | 900 | 1.5 | 4.0 | CE 15 |
| 19 | 1.8 | 900 | 0.5 | 950 | 2.0 | 2.5 | 900 | 2.0 | 4.5 | IE 12 |
| 20 | 1.8 | 900 | 0.5 | 900 | 2.0 | 2.5 | 900 | 2.0 | 4.5 | CE 16 |
| 21 | 0.8 | 900 | 0.5 | 950 | 0.5 | 1.0 | 900 | 1.0 | 2.0 | CE 17 |
| 22 | 0.8 | 900 | 0.5 | 950 | 0.5 | 1.0 | 900 | 2.0 | 3.0 | IE 13 |
| 23 | 1.8 | 900 | 0.5 | 950 | 2.0 | 2.5 | 900 | 2.0 | 4.5 | CE 18 |
| 24 | 0.8 | 900 | 0.5 | 950 | 0.5 | 1.0 | 900 | 2.0 | 3.0 | CE 19 |
| 25 | 1.2 | 900 | 1.0 | 960 | 1.5 | 2.5 | 870 | 6.5 | 9.0 | CE 20 |

IE: Inventive Example

CE: Comparative Example

TABLE 4

| No. | S1* | S2* | Value of Relational Expression 1 | Whether additional heating is not required | Weldability | Formability | Classification |
|---|---|---|---|---|---|---|---|
| 7 | 1.0 | 9 | 15.9 | ○ | A– | ○ | IE 7 |
| 8 | 1.0 | 9 | 9.8 | x | A | ○ | CE 9 |
| 9 | 1.0 | 9 | 9.8 | ○ | A | ○ | IE 8 |
| 10 | 1.0 | 9 | 9.8 | x | A | ○ | CE 10 |
| 11 | 1.0 | 9 | 10.8 | x | A | ○ | CE 11 |
| 12 | 1.0 | 9 | 10.8 | ○ | A | ○ | IE 9 |
| 13 | 1.0 | 9 | 10.8 | x | A | ○ | CE 12 |
| 14 | 1.0 | 9 | 8.8 | x | A | x | CE 13 |
| 15 | 1.0 | 8 | 8.8 | ○ | AA | ○ | IE 10 |
| 16 | 1.0 | 9 | 9.8 | ○ | A | ○ | IE 11 |
| 17 | 1.0 | 9 | 14.8 | x | A | ○ | CE 14 |
| 18 | 1.0 | 9 | 14.8 | x | A | ○ | CE 15 |
| 19 | 1.0 | 14 | 14.8 | ○ | A | ○ | IE 12 |
| 20 | 1.0 | 9 | 14.8 | x | A | ○ | CE 16 |
| 21 | 1.0 | 9 | 6.6 | x | A | x | CE 17 |
| 22 | 1.0 | 6 | 6.6 | ○ | A | ○ | IE 13 |
| 23 | 1.0 | 16 | 14.8 | ○ | A | x | CE 18 |
| 24 | 1.0 | 8 | 6.6 | ○ | A | x | CE 19 |
| 25 | 1.0 | 10 | 8.8 | ○ | A | x | CE 20 |

IE: Inventive Example
CE: Comparative Example

As can be seen from Tables 3 and 4, in Inventive Examples 7 to 13 satisfying all of heating conditions in a heating furnace of the present disclosure, cooling conditions by a lower mold portion, and Relational Expression 1, it was confirmed that productivity, weldability, and formability were all excellent.

In particular, in Inventive Examples 8 to 13 in which a highest atmospheric temperature of section C satisfied Tb−20° C. or less based on a maximum atmospheric temperature Tb of section B, it was confirmed that weldability was further improved than Inventive Example 7, not satisfying the above.

In Inventive Example 10 in which an atmospheric temperature of the C section satisfied 870° C. or more to less than 880° C., it was confirmed that the weldability was further improved than the other inventive examples.

In Comparative Examples 9 to 17, not satisfying at least one of the above-described heating conditions in the heating furnace, the above-described cooling conditions by a lower mold portion, and Relational Expression 1, it was confirmed that at least one of productivity, weldability, and formability was deteriorated.

In particular, in Comparative Examples 18 to 20, not satisfying the condition of Relational Expression 1, it was confirmed that formability was deteriorated, as compared with the inventive examples.

Experimental Example 3

Except for a change to conditions of Tables 5 and 6 below, a hot press-formed member was manufactured in the same manner as in Experimental Example 1. In addition, except that productivity was evaluated by the following method, properties were evaluated based on the same criteria as in Experimental Example 1.

<Whether there was Section in which Temperature of Material was Maintained in Section B>

After a blank, a material, was heated to a set maximum atmospheric temperature of section B, classification was performed as follows depending on whether there was time maintained at the set temperature in section B, and then, productivity was evaluated. This is because that it is not preferable to maintain the temperature in an unnecessarily high-temperature region for a long period of time since it is sufficient to obtain an effect of increasing a temperature rise rate in section B.

○: case in which there was no additional maintaining time
x: case in which there was an additional maintaining time

TABLE 5

| | | Section A | | Section B | | | Section C | | | |
|---|---|---|---|---|---|---|---|---|---|---|
| | | Temperature [° C.] | Time [Min] | Temperature [° C.] | Time [Min] | Cumulative Maintaining Time [Min] | Temperature [° C.] | Time [Min] | Cumulative Maintaining Time [Min] | |
| No. | Mat | | | | | | | | | fic |
| 26 | 1.2 | 750 | 1.0 | 930 | 2.5 | 3.5 | 900 | 0.5 | 4.0 | IE 14 |
| 27 | 1.2 | 750 | 1.0 | 930 | 3.0 | 4.0 | 900 | 0.5 | 4.5 | CE 21 |
| 28 | 1.2 | 750 | 1.0 | 960 | 2.0 | 3.0 | 900 | 0.5 | 3.5 | IE 15 |
| 29 | 1.2 | 750 | 1.0 | 960 | 2.5 | 3.5 | 900 | 0.5 | 4.0 | CE 22 |

IE: Inventive Example
CE: Comparative Example

TABLE 6

| No. | S1* | S2* | Value of Relational Expression 1 | Whether maintaining time of temperature of material does not exist in the section B | Weldability | Formability | Classification |
|---|---|---|---|---|---|---|---|
| 26 | 1.0 | 9 | 9.8 | ○ | A | ○ | IE 14 |
| 27 | 1.0 | 9 | 9.8 | x | A | ○ | CE 21 |
| 28 | 1.0 | 9 | 9.8 | ○ | A | ○ | IE 15 |
| 29 | 1.0 | 9 | 9.8 | x | A | ○ | CE 22 |

IE: Inventive Example
CE: Comparative Example

As can be seen from Tables 5 and 6, in Inventive Examples 14 and 15 satisfying all of heating conditions in a heating furnace of the present disclosure, cooling conditions by a lower mold portion, and Relational Expression 1, it was confirmed that productivity, weldability, and formability were all excellent.

In Comparative Examples 21 and 22, not satisfying the above-described heating conditions in the heating furnace, it was confirmed that productivity was deteriorated.

Experimental Example 4

Except for a change to conditions of Tables 7 and 8 below, a hot press-formed member was manufactured in the same manner as in Experimental Example 1 described above. In addition, except that productivity was evaluated by the following method, properties were evaluated based on the same criteria as in Experimental Example 1.

<Whether to Reach Time at which Thickness of Diffusion Layer is 15 μm>

Productivity was evaluated by performing classification as follows, based on a time at which a thickness of a diffusion layer, regulated to secure physical properties by an automobile company, is 15 μm.

○: case in which the total cumulative maintaining time until the material was removed from the heating furnace was less than the time at which the thickness of the diffusion layer was 15 μm x: case in which the total accumulated maintaining time until the material was removed from the heating furnace was greater than the time at which the thickness of the diffusion layer thickness was 15 μm

TABLE 7

| | | Section A | | Section B | | | Section C | | | |
|---|---|---|---|---|---|---|---|---|---|---|
| | | | | | | Cumulative | | | Cumulative | |
| No. | Thickness of Material [mm] | Temperature [° C.] | Time [Min] | Temperature [° C.] | Time [Min] | Maintaining Time [Min] | Temperature [° C.] | Time [Min] | Maintaining Time [Min] | Classification |
| 30 | 1.2 | 960 | 1.0 | 960 | 1.5 | 2.5 | 960 | 3.5 | 6.0 | CE 23 |
| 31 | 1.2 | 900 | 1.0 | 960 | 1.5 | 2.5 | 930 | 3.5 | 6.0 | IE 16 |
| 32 | 1.2 | 900 | 1.0 | 960 | 1.5 | 2.5 | 930 | 6.5 | 9.0 | CE 24 |
| 33 | 1.2 | 900 | 1.0 | 960 | 1.5 | 2.5 | 870 | 6.5 | 9.0 | IE 17 |

IE: Inventive Example
CE: Comparative Example

TABLE 8

| No. | S1* | S2* | Value of Relational Expression 1 | Thickness of Diffusion Layer [μm] | Whether it is less than time at which thickness of diffusion layer is 15 μm | Weldability | Formability | Classification |
|---|---|---|---|---|---|---|---|---|
| 30 | 1.0 | 9 | 11.8 | 17.5 | x | C | ○ | CE 23 |
| 31 | 1.0 | 10 | 10.8 | 10.2 | ○ | A | ○ | IE 16 |
| 32 | 1.0 | 12 | 10.8 | 19.3 | x | C | x | CE 24 |
| 33 | 1.0 | 8 | 8.8 | 8.0 | ○ | A | ○ | IE 17 |

IE: Inventive Example
CE: Comparative Example

As can be seen from Tables 7 and 8, in Inventive Examples 16 and 17 satisfying all of heating conditions in a heating furnace of the present disclosure, cooling conditions by a lower mold portion, and Relational Expression 1, it was confirmed that productivity, weldability, and formability were all excellent.

In Comparative Example 23, not satisfying the above-described heating conditions in the heating furnace, it was confirmed that productivity and weldability were deteriorated.

In Comparative Example 24, not satisfying the above-described heating conditions in the heating furnace and the above-described cooling conditions by a lower mold portion, it was confirmed that productivity, weldability, and formability were all deteriorated.

Figure 4:
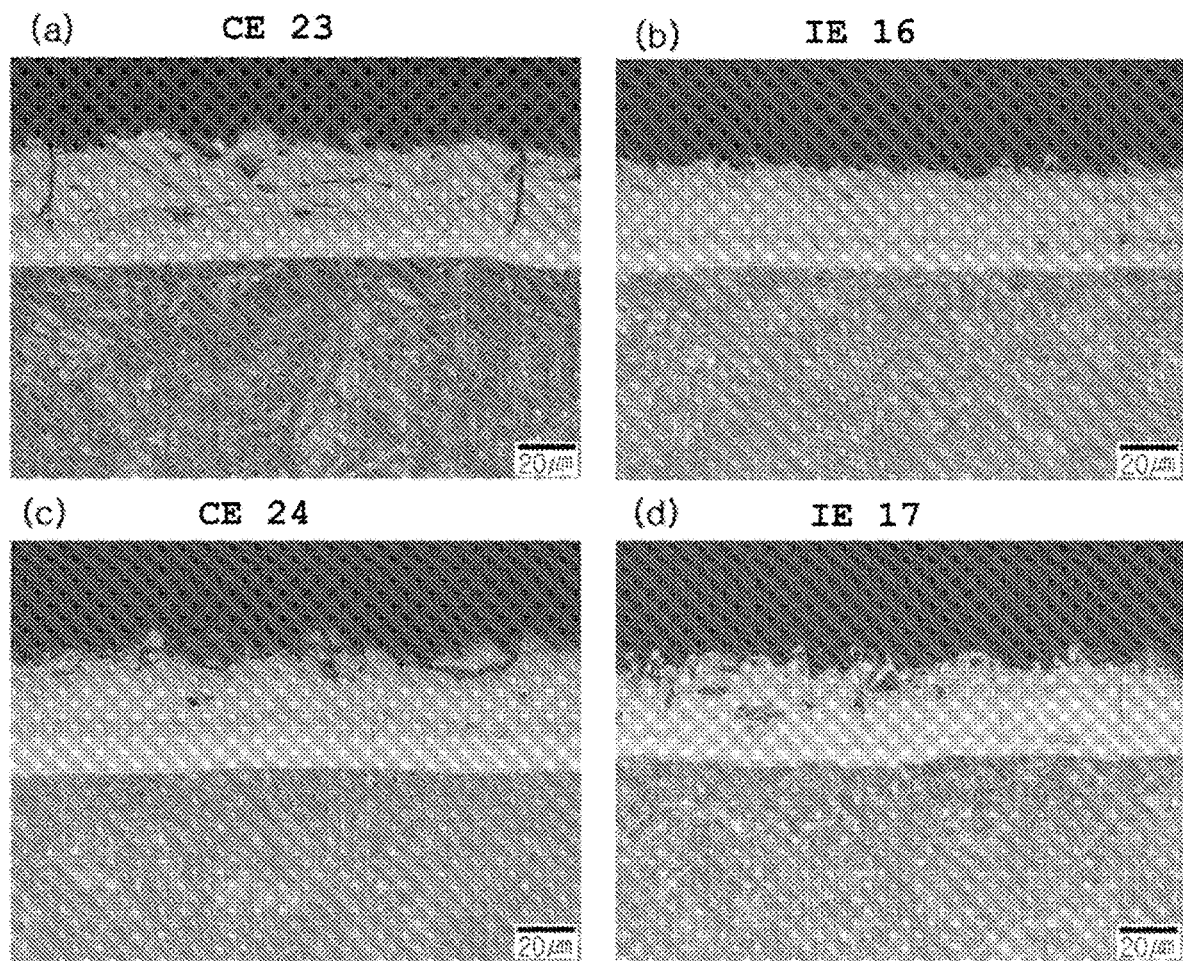
FIG. 4 is an image illustrating an observation result of alloy layers of experimental examples in which an aluminum plated material having a thickness of 1.2 mm is heated under several heating conditions.

Scanning electron microscope (SEM) images of the alloy layers in the above-described experimental examples are illustrated in FIG. 4.

Experimental Examples 5

Except for a change to conditions of Tables 9 and 10 below, a hot press-formed member was manufactured in the same manner as in Experimental Example 4. In addition, properties were evaluated on the same criteria as in Experimental Example 4.

As can be seen from Tables 9 and 10, in Inventive Example 18 satisfying all conditions that a thickness of a plating layer of a blank was 20 μm or more, a thickness of a diffusion layer thickness of a formed member was 15 μm or less, a thickness of an alloy layer of the formed member was 27 to 50 μm, and a ratio of the thickness of the diffusion layer of the formed member to the thickness of the alloy layer of the blank (thickness of diffusion layer/thickness of alloy layer) was 0.33 or less, it was confirmed that weldability was improved, as compared to Inventive Example 19, not satisfying at least one of the above conditions.

Experimental Example 6

Except that a hot press-formed member was manufactured to satisfy the conditions of Tables 11 to 13 below, a blank of a plated steel sheet was formed using the same method as in Experimental Example 1. In addition, an effect of weldability and formability was obtained by the same evaluation method as in Experimental Example 1, and shape precision of the formed member was additionally measured.

<Whether Temperature of Material Reaches Furnace Take-Out Temperature when Material is Removed from Heating Furnace>

In addition, when the material was removed from the heating furnace, productivity was evaluated based on the following criteria depending on whether the temperature of the material reached a furnace take-up temperature.

○: case in which the temperature of the material reached the heating furnace take-out temperature when the material was removed from the heating furnace x: case in which the temperature of the material did not reach the heating furnace take-out temperature when the material was removed from the heating furnace

TABLE 9

| | | Section A | | Section B | | | Section C | | | |
| | | | | | | Cumulative | | | Cumulative | |
| No. | Mat | Temperature [° C.] | Maintaining Time [Min] | Temperature [° C.] | Maintaining Time [Min] | Maintaining Time [Min] | Temperature [° C.] | Maintaining Time [Min] | Maintaining Time [Min] | fic |
| --- | --- | --- | --- | --- | --- | --- | --- | --- | --- | --- |
| 34 | 1.2 | 900 | 1.0 | 960 | 1.5 | 2.5 | 930 | 3.5 | 6.0 | IE 18 |
| 35 | 1.2 | 900 | 1.0 | 960 | 1.5 | 2.5 | 930 | 3.5 | 6.0 | IE 19 |

IE: Inventive Example

TABLE 10

| | | | | Blank | Formed Member | | | | | |
| No. | S1* | S2* | Value of Relational Expression 1 | Thickness of Plating Layer [μm] | Thickness of Diffusion Layer [μm] | Thickness of Alloy Layer [μm] | Productivity | Weldability | Formability | Classification |
| --- | --- | --- | --- | --- | --- | --- | --- | --- | --- | --- |
| 34 | 1 | 10 | 10.8 | 28 | 10.2 | 37.7 | ○ | A | ○ | IE 18 |
| 35 | 1 | 10 | 10.8 | 13 | 11.9 | 20.1 | ○ | B | ○ | IE 19 |

IE: Inventive Example

TABLE 11

| | | Section A | | Section B | | | Section C | | | |
|---|---|---|---|---|---|---|---|---|---|---|
| | | | | | | Cumulative | | | Cumulative | |
| No. | Mat | Temperature [° C.] | Time [Min] | Temperature [° C.] | Time [Min] | Maintaining Time [Min] | Temperature [° C.] | Time [Min] | Maintaining Time [Min] | fic |
| 36 | 1.2 | 870 | 1.0 | 933 | 2.0 | 3.0 | 875 | 1.0 | 4.0 | IE 20 |
| 37 | 1.6 | 900 | 1.0 | 935 | 2.5 | 3.5 | 878 | 1.0 | 4.5 | IE 21 |
| 38 | 1.8 | 900 | 0.5 | 950 | 2.0 | 2.5 | 935 | 2 | 4.5 | IE 22 |
| 39 | 1.2 | 900 | 1.0 | 930 | 1.5 | 2.5 | 916 | 4.0 | 6.5 | IE 23 |

IE: Inventive Example

TABLE 12

| | | First Section | | Second Section | | Third Section | | Fourth Section | | Fifth Section | | Cumulative | |
|---|---|---|---|---|---|---|---|---|---|---|---|---|---|
| No. | Thickness of Material [mm] | Temperature [° C.] | Time [Min] | Temperature [° C.] | Time [Min] | Temperature [° C.] | Time [Min] | Temperature [° C.] | Time [Min] | Temperature [° C.] | Time [Min] | Maintaining Time [Min] | Classification |
| 40 | 1.5 | 875 | 1.5 | 935 | 0.5 | 960 | 0.5 | 940 | 0.5 | 920 | 1.5 | 4.5 | CE 25 |
| 41 | 2 | 895 | 2 | 945 | 0.67 | 970 | 0.67 | 950 | 0.67 | 930 | 1.67 | 5.67 | CE 26 |

CE: Comparative Example

TABLE 13

| No. | S1* | S2* | Value of Relational Expression 1 | Value of Relational Expression 2 | Whether temperature of material reaches furnace take-out temperature when removed from furnace | Weldability | Formability | Classification |
|---|---|---|---|---|---|---|---|---|
| 36 | 1 | 9 | 9.0 | 10.4 | ○ | AA | ○ | IE 20 |
| 37 | 1 | 9 | 12.4 | 9.4 | ○ | AA | ○ | IE 21 |
| 38 | 1 | 9 | 15.9 | 6 | ○ | A– | ○ | IE 22 |
| 39 | 1 | 9 | 10.4 | 2 | ○ | A | ○ | IE 23 |
| 40 | 1 | 9 | 13.0 | 1.3 | x | A | ○ | CE 25 |
| 41 | 1 | 9 | 17.4 | 1.7 | x | C | ○ | CE 26 |

IE: Inventive Example
CE: Comparative Example

As can be seen from Tables 11 to 13, in Inventive Examples 20 to 23, it was confirmed that at least one of productivity and weldability was more excellent than Comparative Examples 25 and 26, not satisfying Relational Expression 2.

In addition, shape precision was measured using a checking fixture at 10 points of the same measurement portion for the formed member obtained from each of the invention examples and comparative example, and the number of measurement points, satisfying more severe condition of ±0.4 mm than ±0.5 mm, a normal shape precision requirement range, was measured. A relative shape precision improvement effect was evaluated based on Comparative Example 25. As a result, it was confirmed that shape precision in Inventive Examples 20 to 22 was improved by 25%, as compared with Comparative Example 25. On the other hand, it was conformed that the shape precision in Comparative Example 26 had the same level as Comparative Example 25.

Experimental Example 7

Except for a change to the condition of Table 14 below, a hot press-formed member was manufactured in the same manner as in Experimental Example 3. In addition, except that bendability was evaluated by the following method, properties were evaluated based on the same criteria as in Experimental Example 3.

<Bendability>

Bendability was evaluated using a three-point bending test, and a bending angle was measured when a maximum load occurred, and thus, classification was performed based on the following criteria.

AA: case in which a maximum load bending angle was greater than 50 degrees

A: case in which a maximum load bending angle ranges from 45 to 50 degrees

TABLE 14

| | | Section A | | Section B | | | Section C | | |
| --- | --- | --- | --- | --- | --- | --- | --- | --- | --- |
| | | | | | | Cumulative | | | Cumulative |
| No. | Mat | Temperature [° C.] | Time [Min] | Temperature [° C.] | Time [Min] | Maintaining Time [Min] | Temperature [° C.] | Time [Min] | Maintaining Time [Min] | fic |
| 42 | 1.8 | 900 | 0.5 | 950 | 2.0 | 2.5 | 900 | 2.0 | 4.5 | IE 24 |
| 43 | 1.8 | 900 | 0.5 | 930 | 2.0 | 2.5 | 900 | 2.0 | 4.5 | IE 25 |

IE: Inventive Example

TABLE 15

| No. | S1* | S2* | Value of Relational Expression 1 | Whether additional heating is not required | Weldability | Formability | Bendability | Classification |
| --- | --- | --- | --- | --- | --- | --- | --- | --- |
| 42 | 1.0 | 14 | 14.8 | ○ | A | ○ | AA | IE 24 |
| 43 | 1.0 | 14 | 14.8 | ○ | A | ○ | A | IE 25 |

IE: Inventive Example

As can be seen from Tables 14 and 15, in Inventive Examples 24 and 25 satisfying manufacturing conditions of a hot press-formed member according to the present disclosure, it was confirmed that productivity, weldability, and formability were all excellent. In particular, in Inventive Examples 24 corresponding to the case in which a thickness of a blank was greater than 1.5 mm and in which a temperature of section B satisfied more than 940° C. to 960° C. or less, it was confirmed that not only productivity, weldability, and formability but also bendability was more excellent than Inventive Example 25, not satisfying the above conditions.

As described above, according to an aspect of the present disclosure, a method of manufacturing a hot press-formed member having improved weldability and formability may be provided.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a hot press-formed member, the method comprising:
heating a blank of an aluminum-based plated steel sheet in a heating furnace;
removing the heated blank from the heating furnace and conveying the removed blank between an upper mold portion and a lower mold portion of a mold, mounted on a press, to be seated; and
performing a forming process after the upper mold portion of the mold is in contact with the seated blank,
wherein the heating furnace is a continuous heating furnace comprising section A, section B, and section C provided in a conveying direction of a blank,
heating in section A satisfies conditions specified by a figure 'abcde' having cumulative in-furnace maintaining times and in-furnace atmospheric temperature coordinates of approximately a(0.2 min, 750° C.), b(1.0 min, 750° C.), c(1.0 min, 800° C.), d(1.5 min, 900° C.), and e(0.2 min, 900° C.),
heating in section B satisfies conditions specified by a figure 'fghi' having cumulative in-furnace maintaining times and atmospheric temperature coordinates of approximately $$f\left(1.3 + \frac{t-1.2}{0.6} \times 0.5 \text{ min}, 930° \text{ C.}\right),$$

$$g\left(3.8 + \frac{t-1.2}{0.6} \times 0.5 \text{ min}, 930° \text{ C.}\right),$$

$$h\left(3.3 + \frac{t-1.2}{0.6} \times 0.5 \text{ min}, 960° \text{ C.}\right), \text{ and}$$

$$i\left(0.8 + \frac{t-1.2}{0.6} \times 0.5 \text{ min}, 960° \text{ C.}\right),$$

and
heating in section C satisfies conditions specified by a figure 'jklm' having cumulative in-furnace maintaining times and atmospheric temperature coordinates of approximately $$j\left(3.7 + \frac{t-1.2}{0.6} \text{ min}, 870° \text{ C.}\right), k\left(11.7 + \frac{t-1.2}{0.6} \times 2 \text{ min}, 870° \text{ C.}\right),$$

-continued $$l\left(7.03 + \frac{t-1.2}{0.6} \times 2 \text{ min, } 940°\text{ C.}\right), \text{ and}$$

$$m\left(2.53 + \frac{t-1.2}{0.6} \text{ min, } 940°\text{ C.}\right),$$

a highest atmospheric temperature of section C is lower than a highest atmospheric temperature of section B, t denotes a thickness of a blank and a unit thereof is millimeters (mm), when the thickness t is 1.5 mm or less, and an atmospheric temperature of section B is more than 930° C. to less than 940° C., when the thickness t is greater than 1.5 mm, and an atmospheric temperature of section B is more than 940° C. to 960° C. or less, and a plating layer of the blank has a thickness of 20 μm or more.

2. The method of claim 1, wherein Relational Expression 1 is satisfied:

$T \leq 8.2 \times t + (\text{temp} - 900)/30$    Relational Expression 1:

where T denotes a sum of time required for conveying and seating a blank and time required before forming is performed after the blank is seated and a unit thereof second (s), t denotes a thickness of a blank and a unit thereof is millimeters (mm), and temp denotes a furnace extraction temperature and a unit thereof is degrees Celsius (° C.).

3. The method of claim 1, wherein a time required before the forming process is performed after the blank is seated is two seconds or less.

4. The method of claim 1, wherein heating in section C is performed at an atmospheric temperature of 930° C. or less.

5. The method of claim 1, wherein a highest atmospheric temperature of section C is Tb−20° C. or less, based on a highest atmospheric temperature (Tb) of section B.

6. The method of claim 1, wherein the thickness t is 1.5 mm or less, and an atmospheric temperature of section C is 870° C. or more to less than 880° C.

7. The method of claim 1, wherein the thickness t is greater than 1.5 mm, and an atmospheric temperature of section C is 870° C. or more to less than 900° C.

8. The method of claim 1, wherein the sum of time required for conveying and seating a blank and time required before forming is performed after the blank is seated is greater than 10 seconds.

9. The method of claim 1, wherein a plating layer of the blank has a thickness of 25 μm or more.

10. The method of claim 1, after the performing of the forming process, further comprising:

an in-mold cooling step in which the upper mold portion of the mold reaches a press bottom dead center and is then maintained to quench a formed material; and a take-out step of removing the cooled formed member, wherein a diffusion layer of the formed member has a thickness of 15 μm or less, and an alloy layer of the formed member has a thickness of 35 μm to 50 μm.

11. The method of claim 1, after the performing of the forming process, the method further comprising:

an in-mold cooling step in which the upper mold portion of the mold reaches a press bottom dead center and is then maintained to quench a formed material; and a take-out step of removing a cooled formed member, wherein a ratio of a thickness of a diffusion layer of the formed member to a thickness of an alloy layer of the formed member (the thickness of the diffusion layer/the thickness of the alloy layer) was 0.33 or less.

12. The method of claim 1, wherein the heating is performed to a condition that a value of Relational Expression 2 below is 2 or more, $$\sum_{n=1}^{x}\left[\left\{(T_n - 870) \times \frac{t_n}{t_{total}} \times 0.1334\right\} \times k\right] \div t$$

where $T_n$ denotes a heating furnace atmospheric temperature in an n-th section in a conveying direction of a blank and a unit thereof is degrees Celsius (° C.), ta denotes a heating furnace maintaining time in the n-th section in the conveying direction of the blank and a unit thereof is minute, $t_{total}$ denotes total maintaining time in the heating furnace and a unit thereof is minute, x denotes the number of sections maintained at a specific atmospheric temperature in the heating furnace, k is an integer of 3 in the case of a final section in section B, an integer of −1 in the case in which a section subsequent to section B, and an integer of 1 in the other cases, and t denotes a thickness of the blank and a unit thereof is millimeters (mm).

* * * * *